United States Patent
Miyamoto et al.

(10) Patent No.: US 8,238,210 B2
(45) Date of Patent: Aug. 7, 2012

(54) OPTICAL RECORDING MEDIUM, OPTICAL RECORDING MEDIUM DRIVING APPARATUS, AND OPTICAL RECORDING MEDIUM DRIVING METHOD

(75) Inventors: Hirotaka Miyamoto, Kanagawa (JP); Takeshi Kubo, Kanagawa (JP); Kimihiro Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/953,545

(22) Filed: Nov. 24, 2010

(65) Prior Publication Data
US 2011/0134732 A1   Jun. 9, 2011

(30) Foreign Application Priority Data
Dec. 4, 2009   (JP) .................. P2009-276318

(51) Int. Cl.
G11B 7/00   (2006.01)

(52) U.S. Cl. .................. 369/53.19; 369/44.32; 369/94; 369/44.37

(58) Field of Classification Search .......... 369/94, 369/103, 44.32, 53.19, 44.26, 44.37, 44.27
See application file for complete search history.

(56) References Cited

U.S. PATENT DOCUMENTS

| | | | |
|---|---|---|---|
| 2006/0158974 A1* | 7/2006 | Kobayashi et al. | 369/53.19 |
| 2008/0013441 A1* | 1/2008 | Oouchida | 369/275.4 |
| 2008/0037085 A1* | 2/2008 | Gabor et al. | 359/24 |
| 2008/0123506 A1* | 5/2008 | Morimoto | 369/103 |
| 2009/0003153 A1* | 1/2009 | Yamatsu | 369/44.38 |
| 2009/0285059 A1* | 11/2009 | Fujita et al. | 369/44.23 |
| 2009/0310473 A1* | 12/2009 | Katsuura et al. | 369/275.4 |
| 2009/0316537 A1* | 12/2009 | Nakatani et al. | 369/44.14 |

FOREIGN PATENT DOCUMENTS

| | | |
|---|---|---|
| JP | 2008-135144 | 6/2008 |
| JP | 2008-176902 | 7/2008 |

* cited by examiner

*Primary Examiner* — Thang Tran
(74) *Attorney, Agent, or Firm* — Wolf, Greenfield & Sacks, P.C.

(57) ABSTRACT

An optical recording medium driving apparatus includes an optical pickup which irradiates first and second laser lights from one object lens with respect to an optical recording medium having a bulk layer and a tilt detection surface; a focus control portion that performs the focus control relative to each predetermined position of the optical recording medium in regard to each of the first and second laser lights; a tracking control portion that controls the position of the object lens to perform the tracking control of the first and second laser lights relative to the optical recording medium; and a tilt control portion.

7 Claims, 15 Drawing Sheets

PRIOR ART

FLUX A

FLUX B

FLUX A

PRIOR ART

OPTICAL RECORDING MEDIUM, OPTICAL RECORDING MEDIUM DRIVING APPARATUS, AND OPTICAL RECORDING MEDIUM DRIVING METHOD

BACKGROUND OF THE INVENTION

1. Field of the Invention

The present invention relates to an optical recording medium that performs the recording and reproducing of signals by the irradiation of light, a driving apparatus and a driving method for the recording and reproducing thereof.

2. Description of the Related Art

As an optical recording medium that performs the recording and reproducing of signals by the irradiation of light, for example, so-called optical discs such as a CD (Compact Disc), a DVD (Digital Versatile Disc), and a BD (Blu-ray Disc: trade mark) are widely used.

In regard to the current conditions regarding an optical recording medium that should take a major role in the next generation of widely-used optical recording mediums such as CD, DVD, BD or the like, firstly, the applicants suggest a so-called bulk recording type of optical recording medium as described in Japanese Unexamined Patent Application Publication Nos. 2008-135144 and 2008-176902.

Herein, the bulk recording is a technique that achieves a large recording capacity by sequentially changing focal positions and performing laser light irradiation, to thereby perform multi-layer recording in a bulk layer 102, with respect to an optical recording medium having at least a cover layer 101 and the bulk layer 102, for example, as shown in FIG. 12.

In regard to the bulk recording, in Japanese Unexamined Patent Application Publication No. 2008-135144, a recording technique referred to as a so-called micro hologram mode is disclosed.

As shown in FIGS. 13A and 13B, the micro hologram mode is classified broadly into a positive type micro hologram mode and a negative type micro hologram mode.

In the micro hologram mode, a so-called hologram recording material is used as a recording material of the bulk layer 102. As the hologram recording material, for example, a photopolymerization type photopolymer or the like is widely used.

As shown in FIG. 13A, the positive type micro hologram type is a method of concentrating two opposed fluxes (flux A and flux B) at the same position to form minute interference patterns (holograms), thereby setting the fluxes to be recording marks.

Furthermore, the negative type micro hologram mode shown in FIG. 13B is a method of erasing the interference patterns formed in advance by laser light irradiation, which is the opposite concept to the positive type micro hologram mode, thereby setting the erased portion to be recording marks.

FIGS. 14A and 14B are diagrams for illustrating the negative type micro hologram mode.

In the negative type micro hologram mode, before performing the recording action, as shown in FIG. 14A, an initialization processing for forming the interference pattern with respect to the bulk layer 102 is performed in advance. Specifically, as shown in the drawings, fluxes C and D are opposed and irradiated by a parallel light, thereby forming the interference patterns in the entirety of the bulk layer 102.

In this manner, after forming the interference patterns by the initialization processing in advance, as shown in FIG. 14B, information recording is performed by the formation of the erased mark. Specifically, by performing the laser light irradiation corresponding to the recording information in the state of focusing on an arbitrary layer position, information recording is performed by the erased mark.

In addition, as another bulk recording method, the applicant suggests a recording method by a void recording (hole recording) mode as disclosed in Japanese Unexamined Patent Application Publication No. 2008-176902 as another bulk recording method.

The void recording mode is a method of performing laser light irradiation at a relatively high power, for example, with respect to the bulk layer 102 formed of the recording material such as photopolymerization type photopolymer, thereby recording the holes (voids) in the bulk layer 102. As described in Japanese Unexamined Patent Application Publication No. 2008-176902, a hole portion formed in this manner becomes a portion having a refractive index different from those of other portions in the bulk layer 102, which can raise the reflectivity of light in the boundary portion. Thus, the hole portion functions as the recording mark, whereby information recording by the formation of the hole mark is realized.

Since the void recording mode does not form the hologram, the recording can be achieved only by performing the light irradiation from one side. That is, there is no necessity to concentrate two fluxes at the same position to form the recording mark in the same manner as the case of the positive type micro hologram mode, and there is no necessity for a high degree of accuracy in position control for concentrating two fluxes at the same position.

SUMMARY OF THE INVENTION

Here, in the same manner as the negative type micro hologram mode or the void recording mode, a case where the laser irradiation is performed from one side of the recording medium to perform the recording and reproducing will be considered.

The principle differs in these modes, but the concept is identical in that light is incident from only one side of a volume type recording medium having the bulk layer, and only the focus position in the bulk layer 102 is changed to perform the multi-layer recording.

In the recording mode, the respective recording layers themselves to be formed in the bulk layer 102 do not have the address information. More accurately, the recording layer is formed by the recording of the recording mark and does not exist before the recording.

Generally, in the optical disc of the related art, a zigzag guide groove called a wobbling groove is formed, and the positional information is obtained by detecting the frequency. However, in the negative type micro hologram mode or the void recording mode, since the recording layer including the wobbling groove in the bulk layer 102 is not formed in advance, the address information may not be given to each recording layer in these modes.

Thus, it is considered that the address information is given to the standard surface and the respective recording layers are recorded so as to correspond to the standard surface. In that case, in order to make the address information of the standard surface correspond to the recording information of the respective recording layers, there is a necessity to correct the spot difference generated by the skew of the disc during recording.

It will be described based on FIGS. 15A to 15C. FIG. 15A schematically shows a cross sectional structure of the disc 100 as the optical recording medium which is used in the negative type micro hologram mode or the void recording mode. In this case, a standard surface 103 is formed between the cover layer 101 and the bulk layer 102.

For example, a wobbling groove is formed in the standard surface 103 to give the address information.

A recording and reproducing apparatus in regard to the disc 100 irradiates two systems of lasers LZ1 and LZ2 from one object lens 200 as shown in the drawings. The laser LZ1 becomes the recording laser and the laser LZ2 becomes the servo laser.

In addition, the laser LZ2 performs the focus control at the standard surface 103, thereby performing a tracking control or an address decode from information of returning light in regard to the standard surface 103 of the laser LZ2.

On the other hand, the laser LZ1 is adapted to perform the focus control using an offset of a depth direction of the disc 100 from the laser LZ2 that was subjected to the focus control at the standard surface 103. In addition, the recording mark is formed in the bulk layer 102 by the laser LZ1, so that the recording layer is formed.

Here, in order to make the address information of the standard surface 103 correspond to the recording information of the recording layer formed by the laser LZ1, as shown in FIG. 15A, it is necessary that a deviation in radial direction of the spots of the lasers LZ1 and LZ2 is nearly 0.

If there is a slope of the opposed state between the disc 100 and an optical system (the object lens 200), whereby, as shown in FIG. 15B, due to the skew of the disc 100 relative to the laser incident light axis, there is a focus position deviation Δx in the radial direction of the disc 100 in regard to both spots, the correspondence of the recorded data and the address by the wobbling groove becomes inaccurate.

In addition, FIG. 15C shows an incident light axis J, a tilt amount θ, a focus position deviation Δx of spots of lasers LZ1 and LZ2, a distance Δt of the lasers LZ1 and LZ2 in a disc thickness direction, a refractive index N of the disc 100, and a disc thickness t. The focus position deviation Δx of the spots becomes Δx=(θ/N)·Δt.

In order to solve the spot deviation, there is a necessity to suitably perform the tilt correction of the relative position between the optical system and the disc 100 during recording or the like.

Thus, in the present invention, it is desirable to solve the problem generated in the case of performing the laser irradiation from one side of the recording medium to the bulk layer to perform the recording and reproducing, in the same manner as the negative type micro hologram mode or the bulk recording mode. That is, it is desirable to enable the deviation in focus positions of the spots in two systems of laser lights to be suitably corrected to perform the recording or the like.

An optical recording medium according to an embodiment of the present invention has a bulk layer on which optical recording information is recorded by laser light irradiation and a plurality of recording layers with optical recording information recorded thereon is formed, and a tilt detection surface which is formed at an inner side from the bulk layer, when seen from a laser light incident surface side.

In addition, the optical recording medium further includes a standard surface, formed with a groove having the address information, at a front side from the bulk layer when seen from the laser light incident surface side.

Alternatively, the tilt detection surface is formed with a groove or pit row having address information.

An optical recording medium driving apparatus according to an embodiment of the present invention includes an optical pickup which irradiates a first and a second laser light from one object lens with respect to an optical recording medium which has a bulk layer on which optical recording information is recorded by laser light irradiation and a plurality of recording layers with optical recording information recorded thereon is formed and which has a tilt detection surface which is formed at an inner side from the bulk layer when seen from a laser light incident surface side; a focus control portion that performs the focus control relative to each predetermined position of the optical recording medium in regard to each of the first and second laser lights; a tracking control portion that controls the position of the object lens to perform the tracking control of the first and second laser lights relative to the optical recording medium; a tilt control portion that varies the slope state of the incident light axis of the first and second laser lights to the optical recording medium, relative to the optical recording medium, based on information of the returning light of the laser light of either the first or second laser lights from the tilt detection surface, thereby performing a tilt correction.

Herein, in the optical recording medium, in a case where, at a front side from the bulk layer when seen from the laser light incident surface side, a standard surface is provided which is formed with a groove having the address information, the first and second laser lights are laser lights having wavelengths different from each other in which the first laser has a short wavelength. When performing the tilt correction, the focus control portion performs the focus control of the first laser light to the tilt detection surface, in the state in which focus control of the second laser light to the standard surface has been performed and the tilt control portion performs the tilt correction based on information of the returning light of the first laser light from the tilt detection surface.

In addition, when performing the recording onto the optical recording medium, in the state in which the tilt correction having been performed, the focus control portion performs the focus control of the second laser light to the standard surface, the tracking control portion performs the tracking control based on information of the returning light of the second laser light from the standard surface, and the focus control portion performs the recording of the optical recording information by the first laser light, in the state of the focus control of the first laser light to the recording layer forming position having been performed.

Moreover, when performing the recording onto the optical recording medium, the address information is obtained from information of the returning light of the second laser light from the standard surface.

Furthermore, in a case where the tilt detection surface in the optical recording medium is formed as a groove or pit row having the address information, the first and second laser lights are laser lights having the same wavelength, and when performing the tilt correction, the focus control portion performs the focus control of the second laser light to the tilt detection surface, and the tilt control portion performs the tilt correction based on information of the returning light of the second laser light from the tilt detection surface.

Moreover, when performing the recording onto the optical recording medium, in the state of the tilt correction having been performed, the focus control portion performs the focus control of the second laser light to the tilt detection surface, the tracking control portion performs the tracking control based on information of the returning light of the second laser light from the tilt detection surface, and the focus control portion performs the recording of the optical recording information by the first laser light, in the state of the focus control of the first laser light to the recording layer forming position having been performed.

Moreover, when performing the recording onto the optical recording medium, the address information is obtained from information of the returning light of the second laser light from the tilt detection surface.

An optical recording medium driving method according to another embodiment of the present invention varies the slope state of an incident light axis of the first and second laser lights onto the optical recording medium relative to the optical recording medium to perform a tilt correction, based on information of the returning light of the laser light of either the first or second laser lights from the tilt detection surface.

In the embodiment of the present invention, a tilt detection surface is provided at an inner side from a bulk layer when seen from a laser incident surface side of the optical recording medium. For example, the tilt detection surface is a reflective surface having a groove or pit row. One of two systems of laser lights is subjected to the focus control with respect to the tilt detection surface, thereby performing the tilt correction from information of the returning light.

According to the embodiment of the present invention, by performing the tilt correction in the state in which a spot position deviation of the two systems of laser lights is not generated using the tilt detection surface, it is possible to make the recording information to the bulk layer in a state that suitably corresponds to the address information recorded on the standard surface or the tilt detection surface.

Furthermore, particularly, by setting the tilt detection surface at a position (inner side from the bulk layer) where a distance of a disc thickness direction from the laser incident surface is lengthened, the detection information of the tilt amount for the tilt correction can be easily obtained from a push pull signal or the like.

DESCRIPTION OF THE PREFERRED EMBODIMENTS

Hereinafter, the embodiment of the present invention will be the following order.

<1. First Embodiment>
[1-1 Structure of Optical Recording Medium]
[1-2 Servo Control]
[1-3 Recording and reproducing Optical System]
[1-4 Tilt correction Processing]
<2. Second Embodiment>
[2-1 Structure of Optical Recording Medium]
[2-2 Servo Control]
[2-3 Recording and reproducing Optical System]
[2-4 Tilt correction Processing]
<1. First Embodiment>
[1-1 Structure of Optical Recording Medium]

Figure 1:
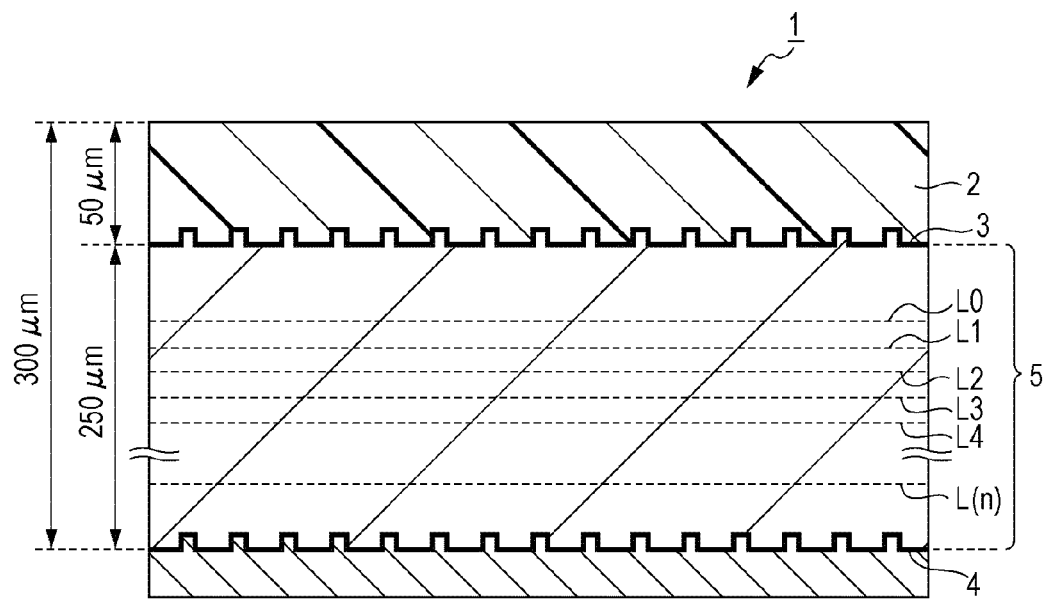
FIG. 1 is an illustrative view of a recording medium of a first embodiment of the present invention.

FIG. 1 shows a cross sectional structural view of an optical recording medium (a recording medium 1) of a first embodiment.

The recording medium 1 shown in FIG. 1 is a disc-shaped optical recording medium, and laser light irradiation relative to the recording medium 1 to be rotated and driven is performed, so that the mark recording (information recording) is performed. Furthermore, the reproduction of the recording information is also performed by irradiating the recording medium 1 to be rotated and driven with the laser light.

In addition, the optical recording medium refers to a recording medium that performs the reproduction of the recording information by the irradiation of light.

In the case of the present example, an optical recording medium is assumed which is, for example, used in the negative type micro hologram mode or the void recording mode.

Figure 14A:
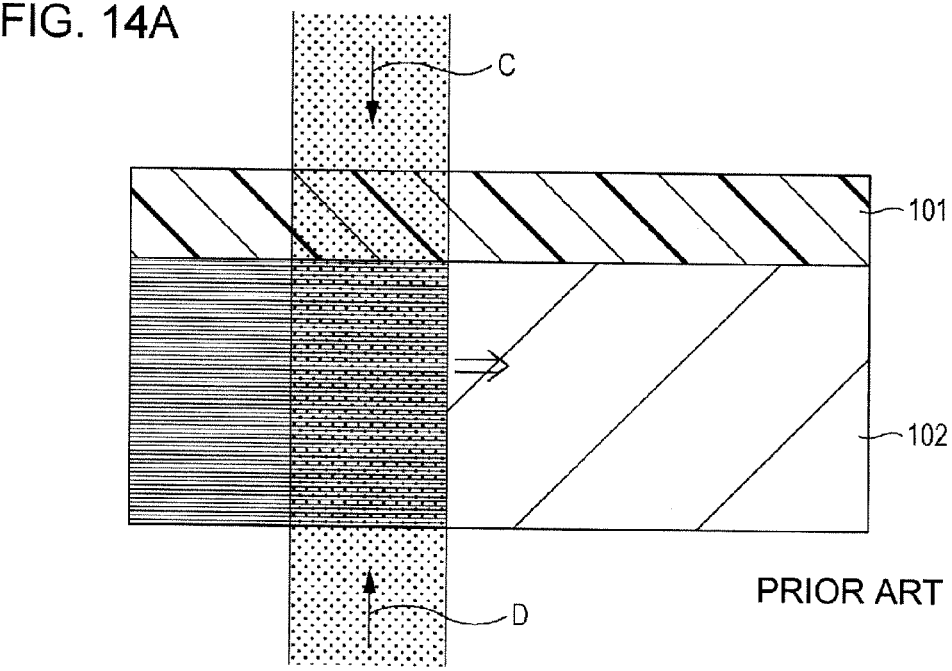
FIGS. 14A and 14B are illustration diagram of a negative type micro hologram recording.
Figure 14B:
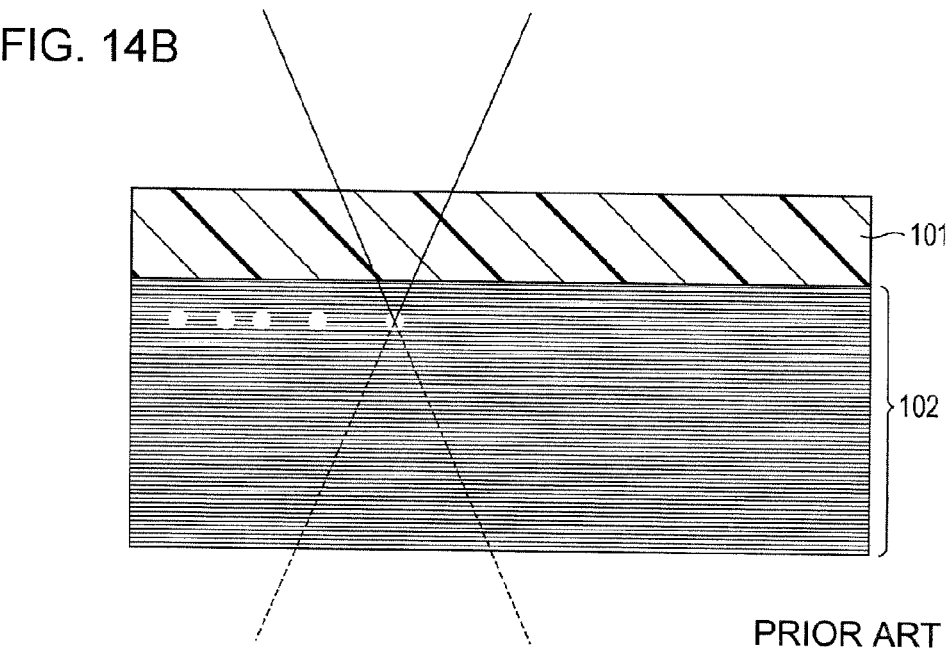
Figure 15A:
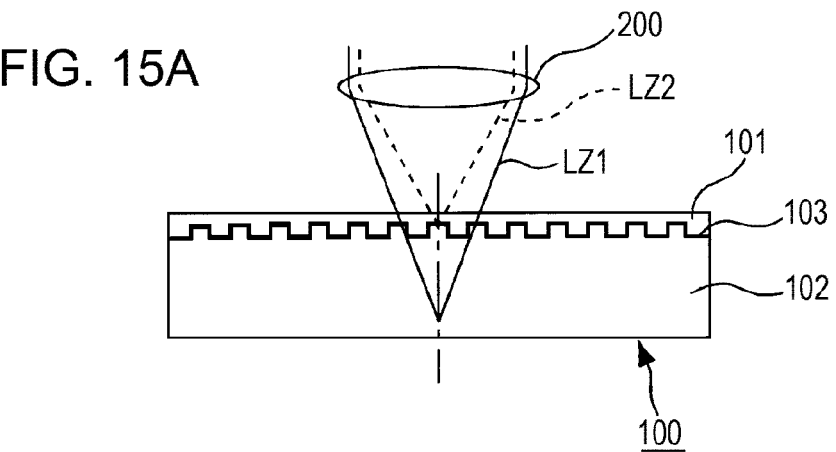
FIGS. 15A to 15C are illustration diagram of a spot difference due to a disc skew.
Figure 15B:
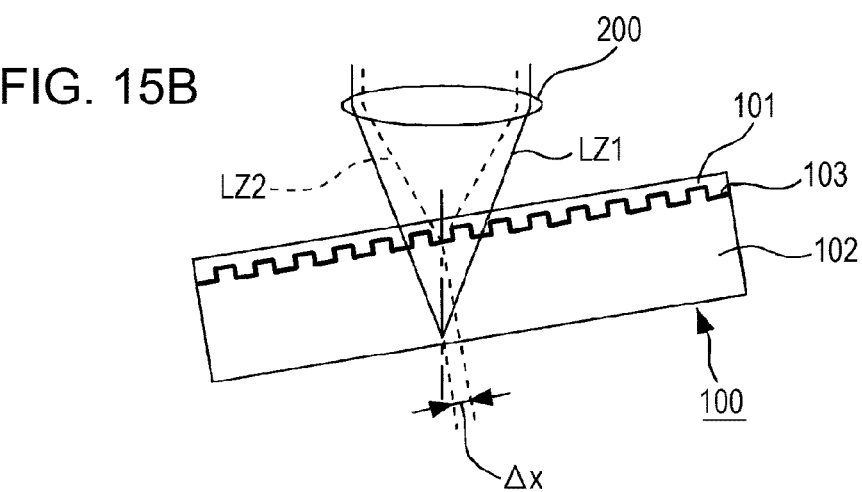
Figure 15C:
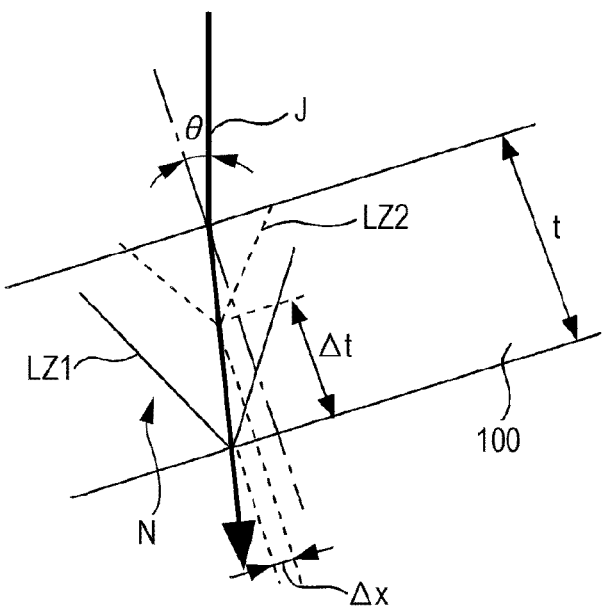

Firstly, as shown in FIGS. 14A and 14B, in the negative type hologram mode, before performing the recording action, an initialization processing for forming an interference pattern with respect to the bulk layer in advance is performed. In this manner, after the interference pattern is formed by the initialization processing in advance, the information recording is performed by the formation of the erased mark.

Specifically, by performing laser light irradiation corresponding to the recording information in the state of focusing on an arbitrary recording layer position, the information recording is performed by the erased mark.

Furthermore, a void recording mode, which forms a so-called hole (void) as the recording mark, performs laser light irradiation at a relatively high power with respect to the bulk layer formed of, for example, a recording material such as photopolymerization type photopolymer, thereby recording the hole (void) in the bulk layer. The hole portion formed in this manner becomes a portion having a refractive index different from those of other portions in the bulk layer, which can raise the reflectivity of light in the boundary portion. Thus, the hole portion functions as the recording mark, whereby the information recording by the formation of the hole mark is realized.

However, the embodiment described later is not applicable only to the negative type micro hologram mode or the void recording mode, but is applicable to an application in which two systems of laser lights for servo and for recording are irradiated from one surface side of the recording medium 1 to perform the information recording onto the bulk layer.

In FIG. 1, the recording medium 1 is a so-called bulk type optical recording medium, and, as shown, in a thickness direction from an upper layer side thereof (a laser incident surface side), a cover layer 2, a standard surface 3, a bulk layer 5, and a tilt detection layer 4 are formed in order.

In addition, in the present specification, terms such as "thickness direction" or "depth direction" are used, but the "thickness direction" and the "depth direction" refer to a direction of the thickness of the recording medium as a direction parallel to the incident direction of the laser light.

In the recording medium 1, the cover layer 2 is formed of, for example, resin such as polycarbonate or acryl, and as shown in the drawing, the standard surface 3 is formed at a lower surface side thereof.

On the standard surface 3, a convex and concave cross sectional shape is provided which corresponds to the formation of a guidance groove for guiding the recording and reproducing position. When seen in a disc plane direction, the guidance groove is formed in a spiral shape.

The guidance groove is formed as a continuous groove or a pit row. For example, in a case where the guidance groove is the groove, by periodically forming the groove in a zigzag (wobbling) manner, it is possible to perform the recording of the address information by means of the periodical information of the zigzag. Hereinafter, it will be described that the standard surface 3 is formed as the continuous groove (wobbling groove) with the address information recorded thereon.

The cover layer 2 is formed by injection molding or the like which uses a stamper formed with a concave and convex shape as the zigzag guidance groove (wobbling groove) to transfer the concave and convex shape onto the lower surface side thereof. A selection reflective film is formed on the concave and convex shape surface of the cover layer 2, whereby the standard surface 3 is formed.

Herein, in the recording mode in relation to the recording medium 1, separately from the recording light (hereinafter, a first laser light) for performing the mark recording with respect to the bulk layer 5 as the recording layer, a servo light (hereinafter, a second laser light) is separately illuminated for obtaining an error signal of the tracking or the focus based on the standard surface 3.

At this time, if the second laser light reaches the bulk layer 5, there is a concern that it adversely affects the mark recording in the bulk layer 5. For this reason, there is a necessity for a reflective film having the selectivity that reflects the second laser light and allows the first laser light to penetrate therethrough.

In the case of the present example, since the first laser light has the wavelength of 405 nm and the second laser light has the wavelength of 660 nm, for example, they are laser lights having the wavelengths different from each other.

In order to correspond to this, as the selection reflective film, a selection reflective film is used which has the wavelength selectivity which reflects the light having the same wavelength band as the second laser light and allows the light of other wavelengths to penetrate therethrough.

At a lower layer side (an inner side when seen from the laser incident surface side) of the standard surface 3, the bulk layer 5 is formed.

As a formation material (a recording material) of the bulk layer 5, a suitable material may be adopted depending on the recording method such as the negative type micro hologram mode or the void recording mode. For example, in the case of the void recording mode, a plastic material is adopted.

In regard to the bulk layer 5, with respect to the respective positions that are predetermined in the depth direction of the bulk layer 5, the laser light is sequentially focused to perform the information recording by the mark formation.

Thus, in the recording medium 1 in which the recording has been completed, a plurality of recording layers L is formed in the bulk layer 5. In the drawing, as shown as recording layers L0 to L(n), a plurality (n+1) of recording layers is formed.

Although the thickness size or the like of the bulk layer 5 are not decided, for example, in a case where it is considered that the blue laser light (wavelength 405 nm) is irradiated by an optical system having NA of 0.85, it is suitable to form the recording layer at positions of 50 μm to 300 μm in the depth direction from the disc surface (surface of the cover layer 2). This is a range that is determined in consideration of spherical aberration correction.

In FIG. 1, there is shown an example of forming the recording layer at positions of 50 μm to 300 μm from the disc surface.

Of course, as the layer gap is narrowed, a plurality (n+1) of the recording layers L can be formed.

Furthermore, in the respective recording layers L, the mark recording is performed in the state in which the tracking servo has been performed using the groove formed in the standard surface 3. Thus, the mark row formed on the recording layer L is formed in the spiral shape when seen in the disc plane direction.

At the lower layer side (an inner side when seen from the laser incident surface) of the bulk layer 5, the tilt detection surface 4 is formed.

The tilt detection surface 4 has a concave and convex cross sectional shape due to the groove or pit row. When seen in the disc plane direction, for example, the groove or pit row is formed in the spiral shape.

The tilt detection surface 4 is formed by the film formation of the reflective film in the concave and convex shape.

In addition, the address information is not recorded on the tilt detection surface 4. The tilt detection surface may have the simple groove or pit row. As described later, the tilt detection surface 4 is irradiated with the first laser light, whereby the tilt amount is detected by the returning light.

The tilt detection surface 4 is formed, for example, at a depth position of 300 μm from the surface of the cover layer 2.

[1-2 Servo Control]

Next, the servo control during recording and reproducing and tilt correction as described later that is applied to the recording medium 1 as the bulk type optical recording medium will be described based on FIGS. 2 and 3.

As described above, with respect to the recording medium 1, the recording mark is formed and the first laser light for performing the information reproduction from the recording mark and the second laser light as a servo light having the wavelength different from that of the first laser light are irradiated.

Although it is described below in FIG. 5, the first laser light and the second laser light are irradiated to the recording medium 1 via a common object lens (an object lens 21 in FIG. 5).

Herein, as shown in FIG. 1, on the bulk layer 5 in the recording medium 1, unlike a multi-layer disc in regard to the optical disc of the development such as, for example, a DVD (Digital Versatile Disc) or a Blu-ray Disc (trade mark), at the respective layer positions which are the recording targets, the reflective surface, which has the guidance groove formed by the pit, the groove or the like, is not formed. For this reason, during recording when the mark is not yet formed, the focus servo or the tracking servo relative to the first laser light may not be performed by the use of the reflective light of the first laser light itself.

From this point, during recording relative to the recording medium 1, the tracking servo and the focus servo in regard to the first laser light are performed using the reflective light of the second laser light as the servo light.

Figure 5:
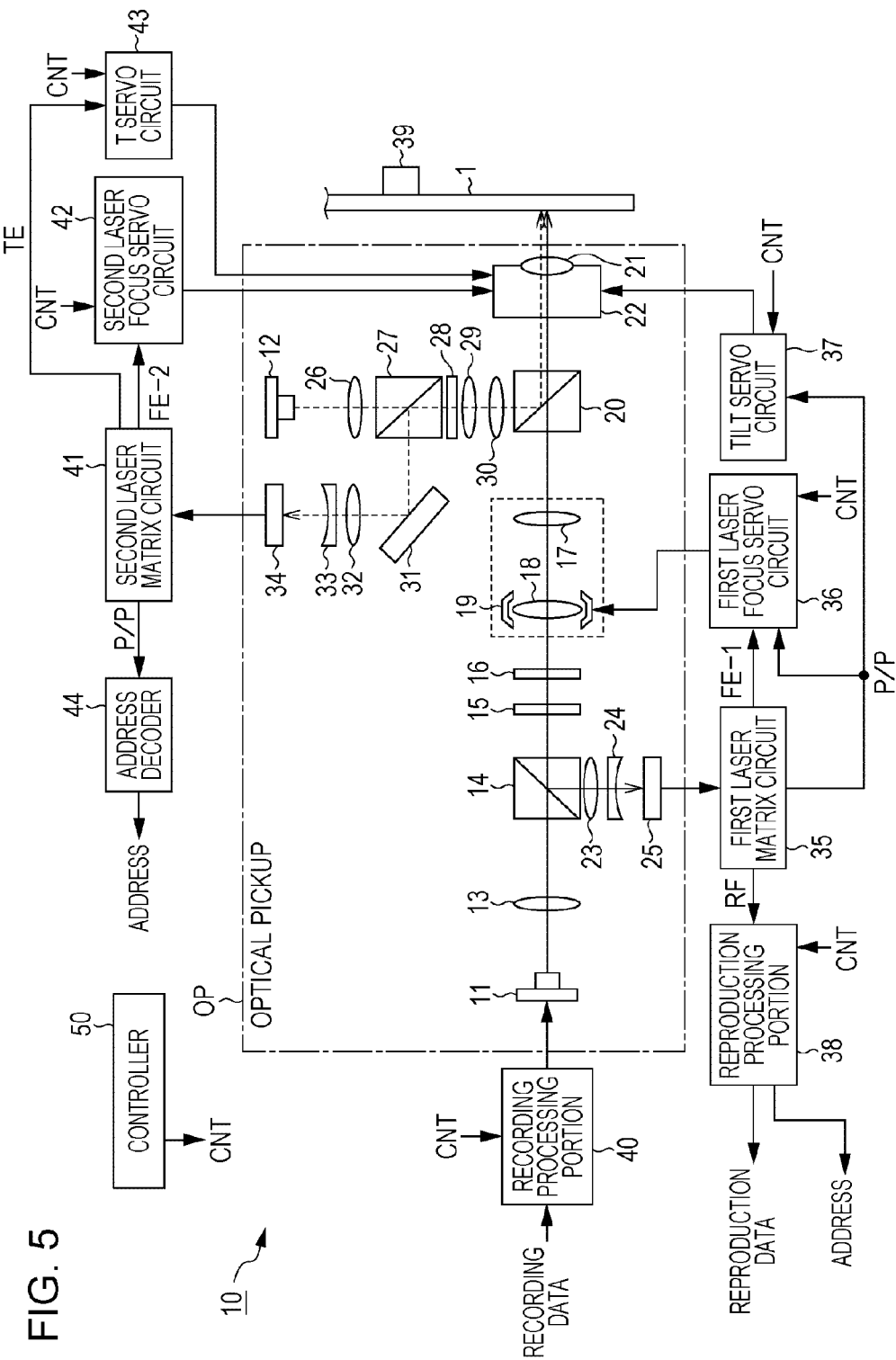
FIG. 5 is an illustration diagram of a recording and reproducing optical system of the first embodiment.

Specifically, in regard to the focus servo of the first laser light during recording, firstly, a focus mechanism (an expander by lenses 17 and 18 and a lens drive portion 19 in FIG. 5) for the first laser light is provided which is capable of independently changing only the focus position of the first laser light. In addition, it is performed by controlling the focus mechanism (expander) for the first laser light based on the offset of as in FIG. 2 on the basis of the standard surface 3.

Herein, as described above, the recording medium 1 is irradiated with the first laser light and the second laser light via the common object lens. In addition, the focus servo of the second laser light is performed by controlling the object lens by the use of the reflective light (returning light) from the standard surface 3 of the second laser light.

In this manner, the first laser light and the second laser light are irradiated via the common object lens, and the focus servo of the second laser light is performed by controlling the object lens based on the reflective light from the standard surface 3 of the second laser light, whereby the focus position of the first laser light basically follows on the standard surface 3. That is, in other words, by the focus servo of the object lens based on the reflective light from the standard surface 3 of the second laser light, a following function is provided which is relative to the surface fluctuation of the recording medium 1 in regard to the focus position of the first laser light.

In addition, by the focus mechanism for the first laser light as described above, the focus position of the first laser light is offset by the value of the offset of. As a result, it is possible to enable the focus position of the first laser light to follow the requisite depth position in the bulk layer 5.

Figure 2:
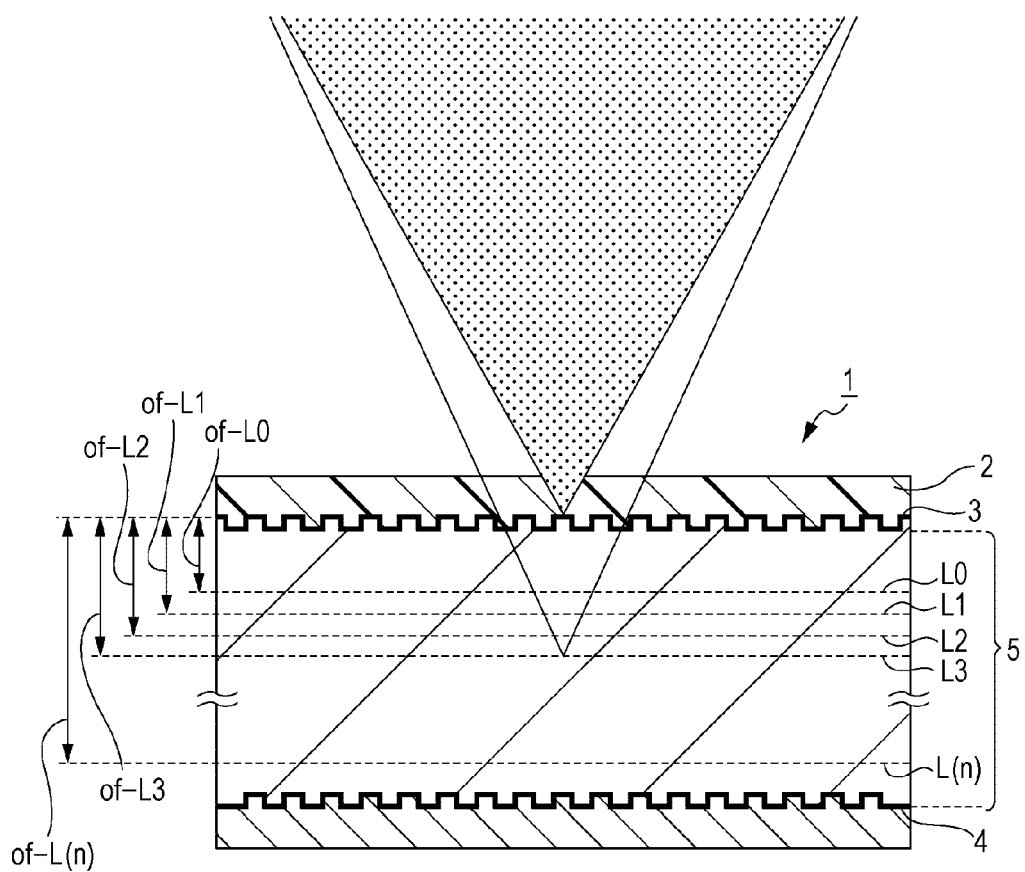
FIG. 2 is an illustration diagram of a servo control during recording of the first embodiment.

FIG. 2 shows an example of each offset of corresponding to a case where the information recording layers L0 to L(n) are set in the bulk layer 5. That is, a case is shown where offset of-L0 corresponding to the layer position of the recording layer L0 is set, offset of-L1 corresponding to the layer position of the recording layer L1 is set, . . . offset of-L(n) corresponding to the layer position of the recording layer L(n) are set.

By driving the focus mechanism for the first laser using the values of the offset of, the formation position (recording position) of the mark in the depth direction can be suitably selected among the positions from the layer position as the recording layer L0 to the layer position as the recording layer L(n).

Furthermore, the tracking servo relative to the first laser light during recording is performed by performing the tracking servo of the object lens that uses the reflective light of the second laser light from the standard surface 3, using the fact that the first laser light and the second laser light are irradiated via the common object lens as described above.

In addition, the acquisition of the address information during recording is acquired from the reflective light information of the second laser light from the standard surface 3, using the fact that the wobbling groove with the address information recorded thereon is formed on the standard surface 3.

On the other hand, during reproduction, as shown in FIG. 1, since the recording layer L is formed on the bulk layer 5, the reflective light of the first laser light from the recording layer L can be obtained. As a result, during reproduction, the focus servo in regard to the first laser light is performed using the reflective light of the first laser light itself.

Specifically, the focus servo in regard to the first laser light during reproduction is performed by controlling the abovementioned focus mechanism for the first laser light based on the reflective light of the first laser light.

In addition, even during reproduction, the tracking servo of the first laser light is realized by performing the tracking servo of the object lens based on the reflective light of the second laser light.

Herein, even during reproduction, in order to read the address information which is recorded on the standard surface 3, the focus servo and tracking servo of the second laser light which is applied to the standard surface 3 are performed.

That is, even during reproduction, in the same manner as during recording, the position control of the objet lens is performed so that the focus servo and the tracking servo of the second laser light which is applied to the standard surface 3 are realized based on the reflective light of the second laser light.

In conclusion, the servo control of the case of the first embodiment is performed as below.

First Laser Light Side

During recording, the focus servo is performed by the driving of the common object lens using the reflective light of the second laser light and by the provision of the offset using the focus mechanism (expander) for the first laser light.

The tracking servo is automatically performed by driving the object lens using the reflective light of the second laser light.

During reproduction, the focus servo is performed by driving the focus mechanism (expander) for the first laser light using the reflective light of the first laser light.

Even during reproduction, the tracking servo of the first laser light is automatically performed by driving the object lens using the reflective light of the second laser light.

Second Laser Light Side

During recording and during reproduction, the focus servo and the tracking servo are performed by driving the object lens using the reflective light of the second laser light.

In addition, during reproduction, after the access to a predetermined address is completed and the reproduction of the recording layer L is actually started, the second laser light may not be used. That is, since it is after the recording mark row has been formed, the focus servo and the tracking servo of the object lens can be performed based on the reflective light of the first laser light from the recording layer L, and the address in data recorded in the recording mark row can be read.

Next, the servo during tilt correction will be described based on FIG. 3.

In the present embodiment, as described later, before the recording and reproducing action, the slope state of the incident light axis of the first and second laser lights onto the recording medium 1 relative to the recording medium 1 is varied to perform the tilt correction. Specifically, the tilt correction can be realized by the driving of the object lens facing the recording medium 1 in the slope direction, the driving of the entirety of the optical pickup including the object lens, driving of the spindle mechanism loaded with the recording medium 1 or the like. That is, a method capable of adjusting the incident angle of the laser optical axis relative to the plane of the recording medium 1 may be adopted. In the present embodiment, an example of driving the object lens to perform the tilt correction is described.

Figure 3:
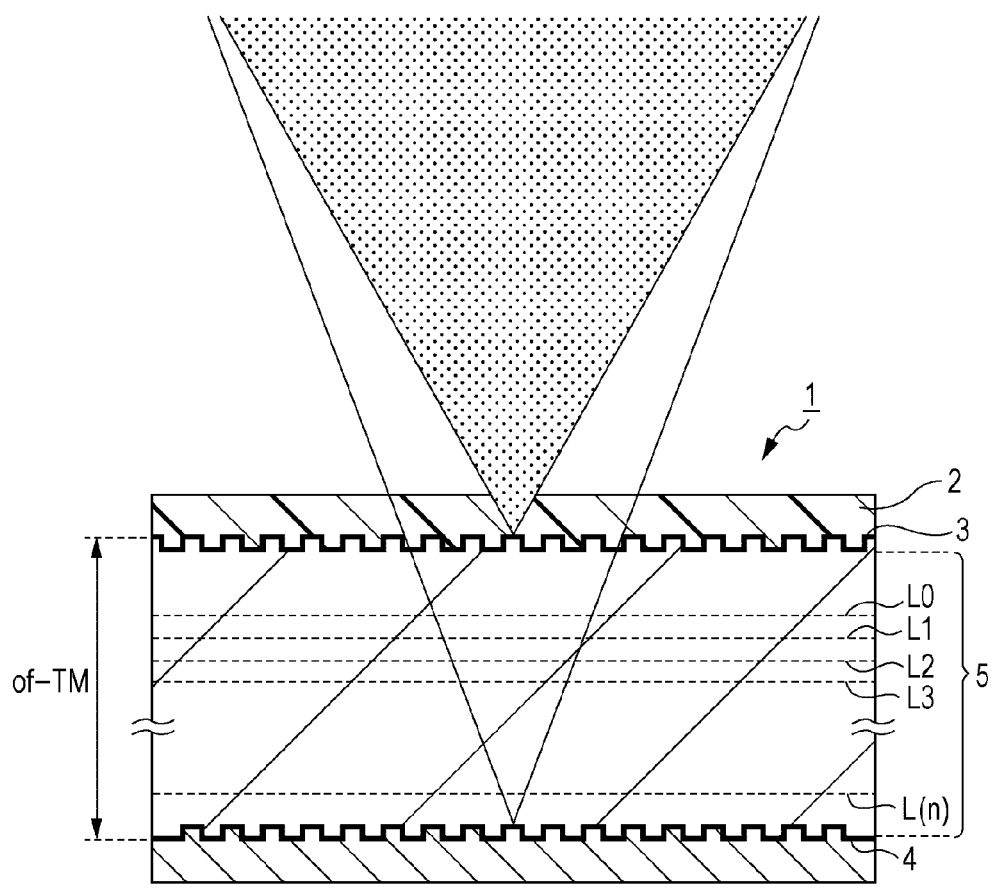
FIG. 3 is an illustration diagram of a servo control during tilt correction of the first embodiment.

As shown in FIG. 3, when performing the tilt correction, the second laser light is subjected to the focus control with respect to the standard surface 3. That is, the focus servo of the second laser light is performed by controlling the object lens using the reflective light (returning light) from the standard surface 3 from the second laser light.

In addition, information for the tilt correction is obtained from the reflective light (returning light) from the tilt detection surface 4 of the first laser light.

Even in this case, by the focus servo of the object lens based on the reflective light from the standard surface 3 of the second laser light, the following function can be provided relative to the plane fluctuation of the recording medium 1 in regard to the focus position of the first laser light. Thus, by the focus mechanism (expander) for the first laser light, the focus position of the first laser light is offset by the value of offset of-TM shown in FIG. 3. The offset of-TM is a value set depending on the distances of the standard surface 3 and the tilt detection surface 4 in the depth direction.

As a result, it is possible to enable the focus position of the first laser light to follow the tilt detection surface 4 that is on the inner side of the bulk layer 5.

In addition, in a case of wanting to perform the tilt correction at a specific position on the recording medium 1, which is a case of wanting to acquire the address information, since the wobbling groove with the address information recorded thereon is formed on the standard surface 3, it may be acquired from the reflective light information of the second laser light from the standard surface 3.

The recording medium 1 of the present embodiment provides the tilt detection surface 4 at the inner side from the bulk layer 5, thereby performing the tilt correction based on the reflective light information of the first laser light relative to the tilt detection surface 4.

Although it will be described later, for example, the push pull signal obtainable from the reflective light information from the tilt detection surface 4 or the RF signal are set to be the signal for the tilt amount detection.

The meaning of disposing the tilt detection surface 4 at the inner side from the bulk layer 5 will be described.

In order to satisfactorily perform the tilt detection, it is suitable that the level fluctuations of the push pull signal or the RF signal are large with respect to the tilt amount. That is, if the push pull signal level declines as the tilt amount increases in a suitable tilt state at a maximum push pull signal level (amplitude), the push pull signal can be used as signal of the tilt amount detection.

Herein, a coma aberration in a case where a parallel flat plate is tilted will be considered. The coma aberration is indicated by the following equation.

$$(1/6) \cdot \{(N^2-1)/(N^3 \lambda)\} \cdot NA^3 \tan \theta \cdot t$$

Herein, N is a medium refractive index, $\theta$ is a laser incident angle relative to the recording medium plane, t is a thickness, $\lambda$ is a laser wavelength, and NA is the number of openings.

Then, the greater the thickness t of the spot position from the laser incident surface and the greater the NA, the greater the coma aberration, whereby the level of the push pull signal declines accordingly.

For this reason, in order to obtain the amplitude level difference depending on the incident angle $\theta$, high NA and thicker thickness t are preferable.

The reason for disposing the tilt detection surface 4 at the inner side from the bulk layer 5 is to make the thickness t thick. In this case, in the example shown in FIG. 1, t=300 μm.

Figure 4:
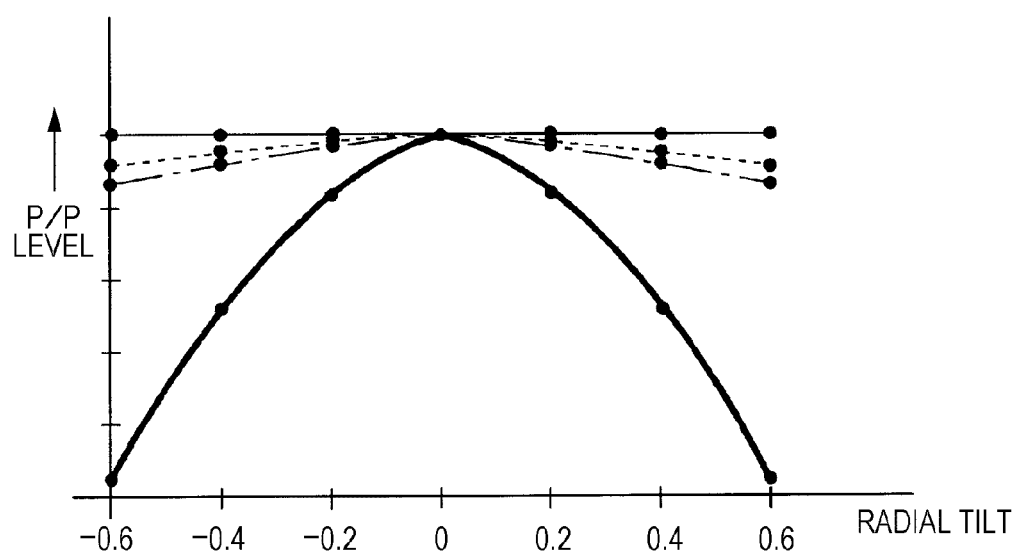
FIG. 4 is an illustration diagram of a relationship between a thickness direction distance and a push pull signal of an embodiment.

FIG. 4 shows the relationship between the radial tilt amount and the push pull signal level.

A thick solid line is a case where t=300 μm, NA=0.85, and $\lambda$=405 nm.

A dot dash line is a case where t=100 μm, NA=0.85, and $\lambda$=405 nm.

A dashed line is a case where t=300 μm, NA=0.65, and $\lambda$=657 nm.

A thin solid line is a case where t=50 μm, NA=0.65, and $\lambda$=657 nm.

From FIG. 4, in the case of low NA (the dashed line and the thin solid line) or in the case of thin thickness t (the dot dash line and the thin solid line), the fluctuation in push pull signal level depending on the tilt amount is slight. In this case, it is difficult to use the fluctuation in push pull signal level as the evaluation value of the tilt amount.

On the other hand, in the case of the thick solid line, when using the first laser light of $\lambda$=405 nm in the state of thick thickness t and the large NA, it can be understood that the amplitude change depending on the tilt amount clearly appears on the push pull signal level.

Herein, while the push pull signal level has been described, the same is also true for the level fluctuation of RF signal.

That is, in the present example, providing the tilt detection surface 4 at the inner side from the bulk layer 5 increases the thickness t, thereby enhancing the tilt detection sensitivity using the push pull signal level or the like.

[1-3 Recording and Reproducing Optical System]

FIG. 5 shows a configuration of a recording and reproducing apparatus 10 (a recording medium driving apparatus) for performing the recording and reproducing in regard to the recording medium 1 of FIG. 1.

The recording medium 1 loaded with respect to the recording and reproducing apparatus 10 is rotated and driven by a spindle motor 39 in the drawing.

In addition, in the recording and reproducing apparatus 10, an optical pickup OP is provided for irradiating the recording medium 1, which is rotated and drive in this manner, with the first laser light and the second laser light.

In the optical pickup OP, there are provided a first laser diode 11, which is a light source of the first laser light for performing the information recording by the formation of the recording mark and the reproduction of information recorded by the recording mark, and a second laser diode 12 which is a light source of the second laser light of the servo light.

Herein, the first laser light and the second laser light as described above have different wavelengths from each other. In the case of the present example, the wavelength of the first laser light is about 405 nm (so-called, blue violet laser light), and the wavelength of the second laser light is about 660 nm (red laser light).

Furthermore, in the optical pickup OP, an object lens 21 is provided which becomes an output end of the first laser light and the second laser light of the recording medium 1 to the recording. NA of the object lens 21 is 0.85.

Moreover, a first photo detector 25 for sensing the reflective light of the first laser light from the recording medium 1 and a second photo detector 34 for sensing the reflective light of the second laser light from the recording medium 1 are provided.

In the optical pickup OP, an optical system is formed for guiding the first laser light emitted from the first laser diode 11 to the object lens 21 and for guiding the reflective light of the first laser light from the recording medium 1 incident onto the object lens 21 to the first photo detector 25.

The path of the first laser light is indicated by the solid line.

Firstly, the first laser light emitted from the first laser diode 11 becomes the parallel light via the collimator 13, and then, is incident onto a polarization beam splitter 14.

The polarization beam splitter 14 is configured so as to allow the first laser light, which is incident via the collimator 13, to penetrate therethrough.

The first laser light which has penetrated the polarization beam splitter 14 passes through a liquid crystal element 15 and a ¼ wavelength plate 16.

Herein, the liquid crystal element 15 is provided to perform, for example, the correction of a so-called axis outer aberration such as coma aberration or astigmatism.

The first laser light which has passed through the ¼ wavelength plate 16 is incident onto an expander including the lenses 17 and 18, and the lens drive portion 19. The lens 17 is a fixed lens and the lens 18 is a movable lens, so that the lens 18 is driven in a direction parallel to the optical axis of the first laser light by the lens drive portion 19, thereby performing the independent focus control in regard to the first laser light.

The expander (the lens drive portion 19) offsets the focus position of the first laser light based on the instruction of the controller 50 during recording and performs the focus control of the first laser light based on the output signal from the first laser focus servo circuit 36 during reproduction.

The first laser light which has passed through the expander is incident onto a dichroic mirror 20. The dichroic mirror 20 is configured so as to cause light having the same wavelength band as that of the first laser light to penetrate therethrough and reflect light of other wavelengths. Thus, the first laser light incident through the expander penetrates the dichroic mirror 20.

Thus, the first laser light which has penetrated the dichroic mirror 20 is irradiated with respect to the recording medium 1 via the object lens 21.

With respect to the object lens 21, an actuator 22 is provided which holds the object lens 21 so as to be displaceable in a focus direction (coming into contact with and separated from the recording medium 1) and in a tracking direction (a direction perpendicular to the focus direction: a radial direction of the recording medium 1). Furthermore, the actuator 22 holds the object lens 21 so as to be displaceable in a tilt direction (a slope direction of the laser optical axis relative to the recording medium 1).

The drive current is respectively given from the second laser focus servo circuit 42 and the tracking servo circuit 43 to the focus coil and the tracking coil, whereby the actuator 22 respectively displaces the focus lens 21 in the focus direction and the tracking direction.

Furthermore, the drive current from the tilt servo circuit 37 is given, whereby the actuator 22 displaces the object lens 21 in the tilt direction.

During reproduction, depending on the irradiation of the first laser light with respect to the recording medium 1 as described above, the reflective light of the first laser light from the recording medium 1 (particularly, the recording layer L to be reproduced in the bulk layer 5) can be obtained. The reflective light of the first laser light obtained in this manner is guided via the object lens 21 to the dichroic mirror 20 and penetrates the dichroic mirror 20.

The reflective light of the first laser light which has penetrated the dichroic mirror 20 passes through the lens 17 and the lens 18 constituting the expander, and then is incident onto the polarization beam splitter 14 via the ¼ wavelength plate 16 and the liquid crystal element 15.

Herein, the reflective light (backward path light) of the first laser light incident onto the polarization beam splitter 14 is configured so that the polarization direction thereof is different from that of the first laser light (forward path light) incident from the first laser diode 11 side to the polarization beam splitter 14 by 90° by the action by the ¼ wavelength plate 16 and the action of the reflection in the recording medium 1. As a result, the reflective light of the first laser light incident as described above is reflected by the polarization beam splitter 14.

The reflective light of the first laser light reflected by the polarization beam splitter 14 is guided to a light concentration lens 23 side in the drawing. In addition, the reflective light is concentrated on the detection surface of the first photo detector 25 via the light concentration lens 23 and a cylindrical lens 24.

Furthermore, in the optical pickup OP, additionally, there is formed an optical system for guiding the second laser light emitted from the second laser diode 12 to the object lens 21 and for guiding the reflective light of the second laser light from the recording medium 1 incident onto the object lens 21 to the second photo detector 34.

The path of the second laser light is indicated by the dashed line.

As shown, the second laser light emitted from the second laser diode 12 is made to be the parallel light by a collimator 26 and is incident onto a polarization beam splitter 27. The polarization beam splitter 27 is configured so as to cause the second laser light (forward path light) incident via the collimator 26 to penetrate therethrough.

The second laser light which has penetrated the polarization beam splitter 27 is incident onto the dichroic mirror 20 via a ¼ wavelength plate 28 and lenses 29 and 30.

As described above, the dichroic mirror 20 is configured so as to cause light having the same wavelength band as that of the first laser light to penetrate and reflect light of other wavelengths. Thus, the second laser light is reflected by the dichroic mirror 20 and is irradiated to the recording medium 1 via the object lens 21 as shown in the drawing.

Furthermore, the reflective light (reflective light from the standard surface 3) of the second laser light obtained corresponding to the irradiation of the second laser light to the recording medium 1 in this manner is reflected by the dichroic mirror 20 via the object lens 21 and passes through the lenses 30 and 29 and the ¼ wavelength plate 28, and then is incident onto the polarization beam splitter 27.

In the same manner as the above first laser light, the reflective light (backward path light) of the second laser light incident from the recording medium 1 side is configured such that the polarization direction thereof is different from that of the forward path light by 90°, by the action of the ¼ wavelength plate 28 and the action of the reflection in the recording medium 1. Thus, the reflective light of the second reflective light as the backward path light is reflected by the polarization beam splitter 27.

In addition, the reflective light of the reflected second laser light is reflected by the mirror 31 and is concentrated on the detection surface of the second photo detector 34 via a light concentration lens 29 and a cylindrical lens 33.

Herein, although the diagrammatic description will be omitted, in the recording and reproducing apparatus 10, a slide drive portion is provided that slides the whole of the optical pickup OP in the tracking direction, whereby the irradiation position of the laser light can be widely displaced by the driving of the optical pickup OP by the slide drive portion.

Furthermore, in the recording and reproducing apparatus 10, there are provided a recording processing portion 40, a first laser matrix circuit 35, a first laser focus servo circuit 36, a tilt servo circuit 37, a reproduction processing portion 38, a second laser matrix circuit 41, a second laser focus servo circuit 42, a tracking servo circuit 43, an address decoder 44, and a controller 50.

Firstly, data (recording data) to be recorded with respect to the recording medium 1 is input to the recording processing portion 40. The recording processing portion 40 performs an addition of an error correction code or a predetermined recording modulation encoding with respect to the input recording data, thereby obtaining recording modulation data rows which are binary data rows of "0" and "1" to be actually recorded on the recording medium 1.

Furthermore, the light strategy is performed based on the recording modulation data row, thereby creating the laser drive signal. In addition, the laser drive signal is given to the first laser diode 11, thereby performing the light emission driving of the first laser diode 11.

The recording processing portion 40 performs such processing corresponding to the instruction (the control signal CNT) from the controller 50.

The first laser matrix circuit 35 includes a current-voltage conversion circuit, a matrix calculation/amplification circuit or the like corresponding to the output current from a plurality of light sensing elements as the first photo detector 25, thereby creating the requisite signal by the matrix calculation processing.

Specifically, a high frequency signal (reproduction signal RF) corresponding to the reproduction signal, a focus error signal FE for the focus servo control, a push pull signal P/P for the tilt servo or the like are created.

Herein, in the focus error signal FE in the present example, there are two types of signals, a signal based on the reflective light of the first laser light and a signal based on the reflective light of the second laser light. Hereinafter, in order to distinguish both signals from each other, the focus error signal FE created in the first laser matrix circuit 32 is referred to as a focus error signal FE-1.

The reproduction signal RF created in the first laser matrix circuit 35 is supplied to the reproduction processing portion 38. Furthermore, the focus error signal FE-1 is supplied to the first laser focus servo circuit 37. The push pull signal P/P is supplied to the tilt servo circuit 37 and the first laser focus servo circuit 36.

The reproduction processing portion 38 performs the reproduction processing for restoring the recording data such as the binarization processing, the decoding and error correction processing of the recording modulation code or the like in regard to the reproduction signal RF created in the first laser matrix circuit 35, thereby obtaining the reproduction data that reproduced the recording data.

Furthermore, during reproduction, the extraction of the address information from the reproduction data is also performed. The address information is supplied to the controller 50.

Moreover, the first laser focus servo circuit 36 creates the focus servo signal based on the focus error signal FE-1 and controls the driving of the lens drive portion 19 based on the focus servo signal, thereby performing the focus servo control relative to the first laser light.

During recording or during tilt correction, the first laser focus servo circuit 36 drives the lens drive portion 19 based on a predetermined offset of (see FIGS. 2 and 3) corresponding to the instruction (control signal CNT) provided from the controller 50.

Furthermore, during reproduction, the first laser focus servo circuit 36 performs the focus servo control of the first laser light by the driving of the lens drive portion 19 based on the reflective light of the first laser light.

Furthermore, during reproduction, the first laser focus servo circuit 36 performs the driving control of the lens drive portion 19 so that an interlayer jump action between the recording layers L formed on the recording medium 1 or a leading-in of the focus servo relative to the requisite information recording surface L are performed corresponding to the instruction (control signal CNT) provided from the controller 50.

Moreover, during tilt detection described later, the first laser focus servo circuit 36 also performs the minute adjustment of the expander (lens drive portion 19) depending on the push pull signal P/P.

The tilt servo circuit 37 supplies the actuator 22 with the tilt drive signal and drives the object lens 21 as the action for the tilt correction to the actuator 22 in the tilt direction. In addition, by the push pull signal P/P to be input, it is decided whether or not there is an optimal tilt state.

As described in FIG. 4, the push pull signal P/P becomes the maximum amplitude level in the optimal tilt state. Thus, the tilt servo circuit 37 performs the action of exploring a tilt correction position where the level of the push pull signal P/P is maximized, while driving the actuator 22 in the tilt direction.

The tilt servo circuit 37 performs the action based on the instruction (control signal CNT) from the controller 50. In the case of the present example, the controller 50 controls the tilt servo circuit 37 so as to perform the tilt correction before the recording action or the reproduction action.

In addition, in the present example, it is described that the push pull signal P/P is used in the tilt correction, but the decision of the tilt state may be performed using the level of the reproduction signal RF or another index such as a jitter value.

On the other hand, in regard to the second laser light side, the second laser matrix circuit 41 includes a current-voltage conversion circuit, a matrix calculation/amplification circuit or the like corresponding to the output current from a plurality of light sensing elements as the second photo detector 34 and creates the requisite signal by the matrix calculation processing.

Specifically, the second laser matrix circuit 41 creates a focus error signal FE-2 for the servo control, a tracking error signal TE, and a push pull signal P/P for the address extraction.

The focus error signal FE-2 is supplied to the second laser focus servo circuit 42, and the tracking error signal TE is supplied to the tracking servo circuit 43. The push pull signal P/P is supplied to the address decoder 44.

The second laser focus servo circuit 42 creates the focus servo signal based on the focus error signal FE-2 and drives the focus coil of the actuator 22 based on the focus servo signal, thereby performing the focus servo control relative to the object lens 21. As described above, the focus servo control of the object lens 21 is performed based on the reflective light of the second laser light during recording and reproducing.

The second laser focus servo circuit 42 drives the focus coil such that the leading-in of the focus servo to the standard surface 3 formed on the recording medium 1 is performed corresponding to the control signal CNT from the controller 50.

In addition, the focus servo control can use an astigmatic method, a SSD (Spot Size Detection) method, a differential astigmatic method or the like.

The tracking servo circuit 43 creates the tracking servo signal based on the tracking error signal TE from the second laser matrix circuit 41 and drives the tracking coil of the actuator 22 based on the tracking servo signal. As described above, the tracking servo control of the object lens 21 is performed based on the reflective light of the second laser light during recording and reproducing.

In addition, the tracking servo control can use a PP (push pull) method, a DPP (differential push pull) method or the like.

The address decoder 44 performs the decoding of the address information from the input push pull signal P/P.

Since the second laser light is focused on the standard surface 3, the reflective light thereof has information of the wobbling groove formed on the standard surface 3.

The second laser matrix circuit 41 gives the address decoder 44 information of the wobbling groove as the push pull signal P/P. The address decoder 44 decodes the address information from the push pull signal P/P to supply the address information to the controller 50.

The controller 50 is formed of a micro computer including, for example, a memory (storage apparatus) such as a CPU (Central Processing Unit) or a ROM (Read Only Memory), and performs the processing according to the program stored in, for example, the ROM or the like. In addition, the controller 50 gives each requisite portion the control signal CNT, thereby performing the overall control of the recording and reproducing apparatus 10.

During recording, the controller 50 performs the controlling (selection of the recording position in the depth direction) of the focus position of the first laser light based on the values of the offset of which were set corresponding to each layer position as described in FIG. 2. That is, the controller 50 performs the selection of the recording position in the depth direction, by commanding the first laser focus servo circuit 36 to drive the lens drive portion 19 based on the values of the offset of which were set corresponding to the layer position to be recorded.

The values of the offset of are stored in the ROM in the controller 38, a flash memory or the like. By the setting of the values of offset of-L0 to of-L(n), the positions of each recording layer L0 to L(n) in the recording medium 1 are set.

As described above, the tracking servo control during recording is performed based on the reflective light of the second laser light. For this reason, during recording, the controller 50 commands the tracking servo circuit 43 to perform the tracking servo control based on the tracking error signal TE.

Furthermore, during recording, the controller 50 commands the second laser focus servo circuit 42 to perform the focus servo control (focus servo control in regard to the object lens 21) based on the focus error signal FE-2.

On the other hand, during reproduction, the controller 50 performs the command relative to the first laser focus servo circuit 36, thereby focusing the first laser light to the recording layer L on which data to be reproduced is recorded. That is, in regard to the first laser light, the controller 50 performs the focus servo control targeting the recording layer L.

Furthermore, even during reproduction, the controller 50 performs the tracking servo control based on the tracking error signal TE by the tracking servo circuit 43.

Furthermore, during reproduction, the controller 50 performs the focus servo control (the focus control of the object lens 21) based on the focus error signal FE-2 by the second laser focus servo circuit 42.

[1-4 Tilt Correction Processing]

The tilt correction processing performed by the recording production apparatus 10 will be described.

The controller 50 controls each portion so as to implement the tilt correction, for example, before the recording action and the reproduction action.

Figure 6:
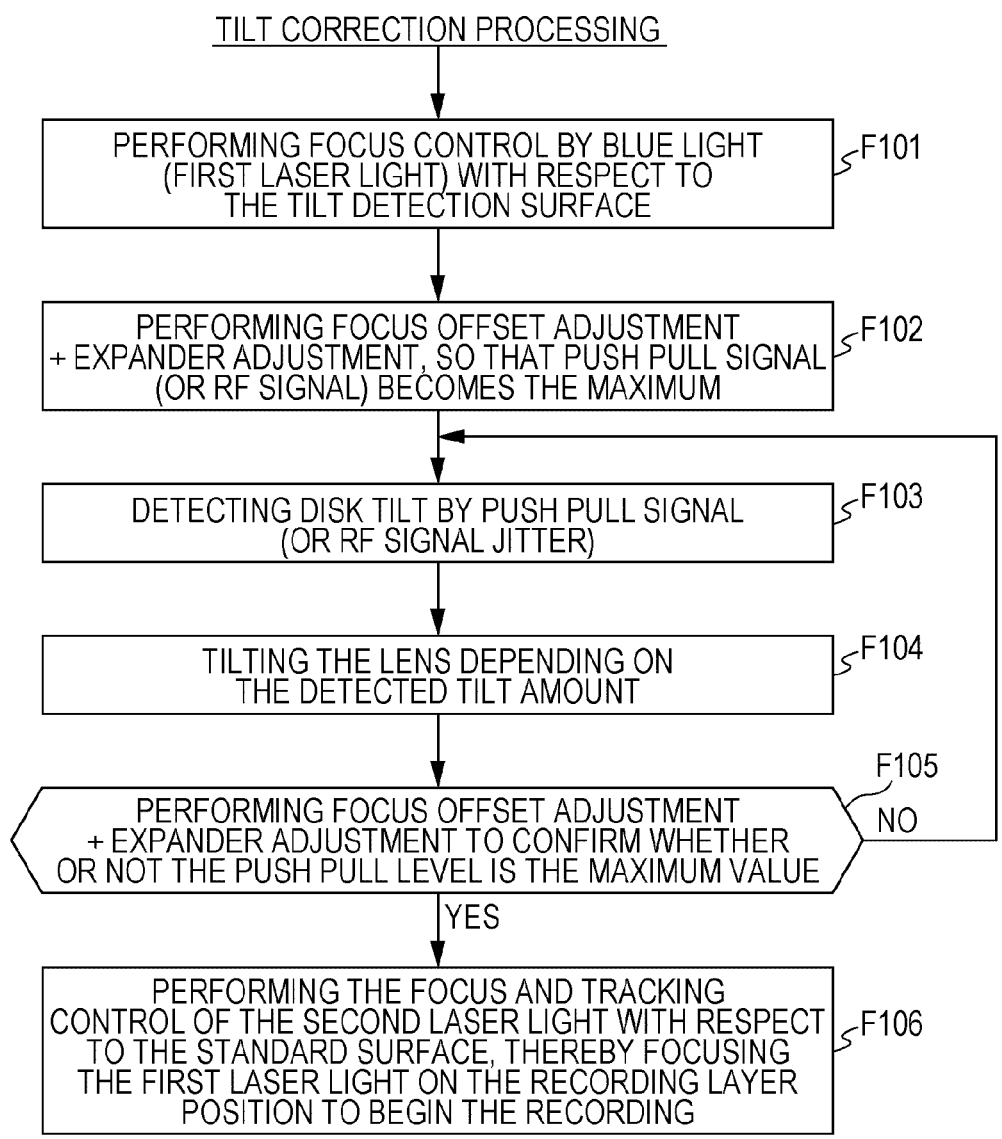
FIG. 6 is a flow chart of a tilt correction processing of the first embodiment.

FIG. 6 is a flow chart of the tilt correction processing before the recording action performed by the recording and reproducing apparatus 10. The actions of each step are configured so that each portion is performed based on the instruction of the controller 50.

Firstly, as step F101, the focus control of the first laser light to the tilt detection surface 4 is performed.

In this case, the second laser focus servo circuit 42 controls the actuator 22, so that the second laser light is focused on the standard surface 3 by the object lens 21. In addition, the first laser focus servo circuit 36 drives the lens drive portion 19 of the expander, so that the offset of-TM of FIG. 3 can be obtained. As a result, the first laser light is subjected to the focus control at the tilt detection surface 4.

However, in this case, since the first laser light is merely the focus control by the offset of-TM, due to the thickness error up to the tilt detection surface 4 of the recording medium 1, it may not be said for sure that this is an optimal focus state.

Thus, as step F102, the focus offset adjustment in the first laser focus servo circuit 36 or a minute adjustment of the expander are performed, so that the level of the push pull signal P/P input to the first laser focus servo circuit 36 is maximized. In addition, the reproduction signal RF at this time may be detected, thereby performing the adjustment so that the reproduction signal RF is maximized.

When the focus control has been completed in steps F101 and F102, next, in steps F103 and F104, the correction action by the tilt servo circuit 37 is performed.

Firstly, in step F103, the tilt servo circuit 37 confirms the level of the push pull signal P/P to be input, thereby detecting the tilt amount. In addition, the tilt amount can also be detected from the jitter of the reproduction signal RF.

In addition, in step F104, the actuator 22 is driven depending on the tilt amount, thereby driving the object lens 21 in the tilt direction.

In that state, in step F105, the first laser focus servo circuit 36 performs the focus offset adjustment and the minute adjustment of the expander again.

In addition, it is confirmed whether or not the level of the push pull signal P/P is maximized. That is, the level of the push pull signal P/P as the index indicating the tilt amount is confirmed, thereby confirming whether or not the tilt amount becomes optimal (≈zero).

At this time, if the tilt amount=zero (or within a predetermined allowable range), the tilt correction is completed and the process progresses to step F106.

On the other hand, if the tilt amount is not zero or within a predetermined allowable range, the progress returns to step F103 to continue the tilt correction. That is, the tilt servo circuit 37 detects the tilt amount from the level of the push pull signal P/P at that time again, thereby driving the object lens 21 in the tilt direction depending on the tilt amount.

This processing is repeated until the tilt amount=zero (or within a predetermined allowable range) in step F105.

After the tilt correction has been completed in step F105, the recording begins in step F106. In this case, the second laser light is subjected to the focus control at the standard surface 3 by the second laser focus servo circuit 42, and the tracking servo circuit 43 performs the tracking control.

Furthermore, in regard to the first laser light, the first laser focus servo circuit 36 controls the expander (lens drive portion 19), thereby giving the offset of (see FIG. 2) corresponding to the depth position of the recording layer L to be recorded.

In this state, the address information obtained from the returning light of the second laser light, the absolute position on the recording medium 1 is confirmed, thereby starting the mark recording by the first laser light from a predetermined address.

As described above, according to the first embodiment, by performing the tilt correction before the start of recording, the recording is performed in the state in which a difference in spots between the first laser light and the second laser light is eliminated.

Thus, the corresponding relationship between the address information, which is recorded on the standard surface 3 by the wobbling groove, and the recording information in the recording layer L becomes optimal. As a result, in the recording medium 1 in which the address information is recorded on the standard surface 3, accurate recording onto the bulk layer 5 is realized without the address information.

In addition, even during reproduction, it is desirable to perform the same tilt correction as steps F101 to F105 of FIG.

6. As a result, the access to the reproduction position based on the address information obtained from the standard surface 3 is accurately implemented.

<2. Second Embodiment>
[2-1 Structure of Optical Recording Medium]

Next, a second embodiment will be described.

Figure 7:
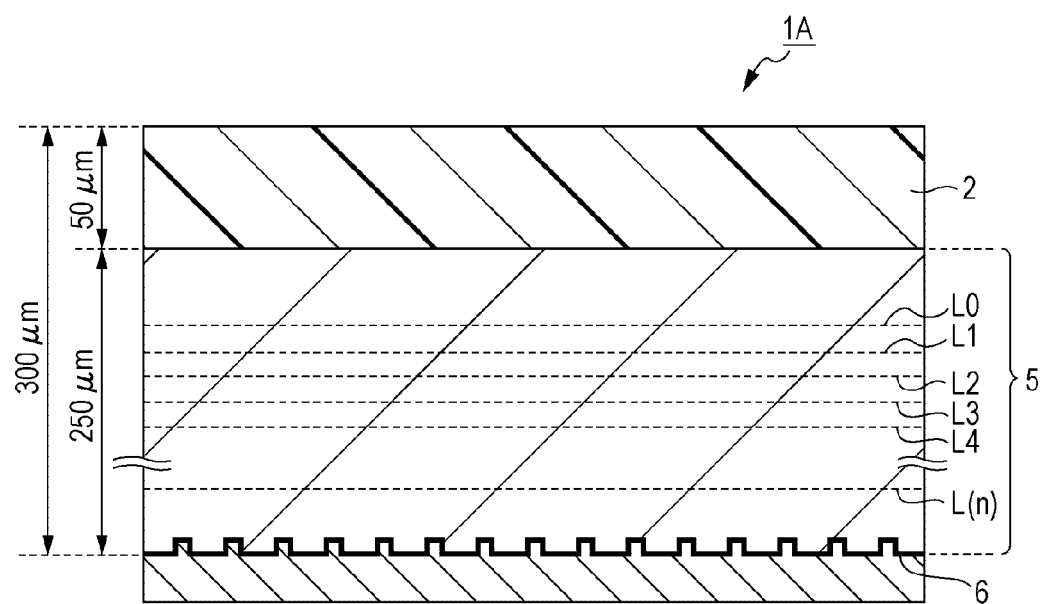
FIG. 7 is an illustrative view of a recording medium of a second embodiment.

A cross sectional structure of an optical recording medium (recording medium 1A) of the second embodiment is shown in FIG. 7.

In the same manner as the recording medium 1 of the first embodiment, the recording medium 1A is also a disc-shaped optical recording medium, and laser light irradiation relative to the recording medium 1A to be rotated and driven is performed to perform the mark recording (information recording). Furthermore, the reproduction of the recording information is performed by irradiating the laser light with respect to the recording medium 1A to be rotated and driven.

In addition, for example, by the negative type micro hologram mode, the void recording mode or the like, two systems of laser lights for servo and for recording are irradiated from one surface side of the recording medium 1A, thereby performing the information recording on the bulk layer.

The recording medium 1A of FIG. 2 is a bulk type optical recording medium and is formed with the cover layer 2, the bulk layer 5, and the standard and tilt detection surface 6 from the laser incident surface in the thickness direction in order.

The recording medium 1A differs from the recording medium 1 of the first embodiment in that the standard surface 3 is not provided between the cover layer 2 and the bulk layer 5 and the standard and tilt detection surface 6 at the inside from the bulk layer 5 doubles as the function of the standard surface and the function of the tilt detection surface.

The cover layer 2 or the bulk layer 5 is the same as the recording medium 1 of the first embodiment.

On the standard and tilt detection surface 6, the concave and convex cross sectional shape is provided. When seen in the disc plane direction, the concave and convex shape is formed in a spiral shape. In addition, a reflection film is formed on the concave and convex shape.

The concave and convex shape is formed by a continuous groove or pit row. For example, in the case of the groove, by forming the groove in a periodic zigzag (wobbling) manner, the address information is recorded by the periodic information of the zigzag. Hereinafter, it will be described that the standard and tilt detection surface 6 is formed as the continuous groove (wobbling groove) with the address information recorded thereon.

In regard to the bulk layer 5, with respect to each predetermined position in the bulk layer 5 in the depth direction, the laser light is sequentially focused, thereby performing the information recording by the mark formation.

Thus, in the recording medium 1 in which the recording has been completed, a plurality of recording layers L are formed in the bulk layer 5. In the drawing, as shown by the recording layers L0 to L(n), a plurality (n+1) of recording layers is formed.

Although the thickness size or the like of the bulk layer 5 is not definite, for example, in the case of considering that blue laser light (wavelength 405 nm) is irradiated by an optical system having NA of 0.85, it suitable to form the recording layer at a position from the disc surface (a surface of the cover layer 2) in the depth direction by 50 μm to 300 μm. This is a range that considers the spherical aberration correction. In FIG. 7, there is shown an example in which the recording layer is formed at a position of 50 μm to 300 μm from the disk surface.

Furthermore, for this reason, the standard and tilt detection surface 6 is formed at a depth position of 300 μm from the surface of the cover layer 2.

Moreover, in each recording layer L, the mark recording is performed in the state in which the tracking servo is taken using the groove formed on the standard and tilt detection surface 6. Thus, the mark row formed on the recording layer L is formed in the spiral shape when seen in the disc plane.

[2-2 Servo Control]

A servo control targeting the recording medium 1A during recording and reproducing and during tilt correction will be described with reference to FIGS. 8 and 9.

In the case of the second embodiment, with respect to the recording medium 1A, blue laser light (e.g., 405 nm) formed by one laser diode is irradiated so as to be divided into paths of two systems in the optical system.

Although the optical system path will be described in FIG. 10, the first path laser light is used for forming the recording mark and performing the information reproduction from the recording mark, and the second path laser light is used for servo.

Although it is described later in FIG. 10, the first path laser light and the second path laser light are separated from each other on the optical system path, and then are guided to a common object lens (the object lens 21 in FIG. 10) again, thereby being irradiated from the object lens 21 to the recording medium 1A.

In the bulk layer 5 in the recording medium 1A, a reflective surface having a guidance groove by the pit, the groove or the like was not formed at each layer position to be recorded. For this reason, during recording when the mark is not yet formed, it is difficult to perform the focus servo or the tracking servo in regard to the first path laser light using the reflective light of the first path laser light itself.

Thus, during recording in the recording medium 1A, both of the tracking servo and the focus servo in regard to the first path laser light are performed using the reflective light of the second path laser light as the servo light.

Specifically, in regard to the focus servo of the first path laser light during recording, firstly, a first path laser light focus mechanism (expander by lenses 55 and 56 and a lens drive portion 57 in FIG. 10) is provided that can independently change only the focus position of the first path laser light. In addition, as shown in FIG. 8, on the basis of the offset of which uses the standard and tilt detection surface 6 as a reference, it is performed by controlling the first path laser light focus mechanism (expander).

As described above, the first path laser light and the second path laser light are irradiated to the recording medium 1A via the common object lens. In addition, the focus servo of the second path laser light is performed by controlling the object lens using the reflective light (returning light) from the standard and tilt detection surface 6 of the second path laser light.

In this manner, the first path laser light and the second path laser light are irradiated via the common object lens, and the focus servo of the second path laser light is performed by controlling the object lens based on the reflective light from the standard and tilt detection surface 6 of the second path laser light, whereby the focus position of the first path laser light basically follows the standard and tilt detection surface 6.

In other words, by the focus servo of the object lens based on the reflective light from the standard and tilt detection surface 6 of the second path laser light, the following function is given relative to the plane change of the recording medium 1A in regard to the focus position of the first path laser light.

In addition, by the first path laser light focus mechanism as described above, the focus position of the first path laser light is offset by the value of the offset of. As a result, it is possible to cause the focus position of the first path laser light to follow a requisite depth position in the bulk layer 5.

Figure 8:
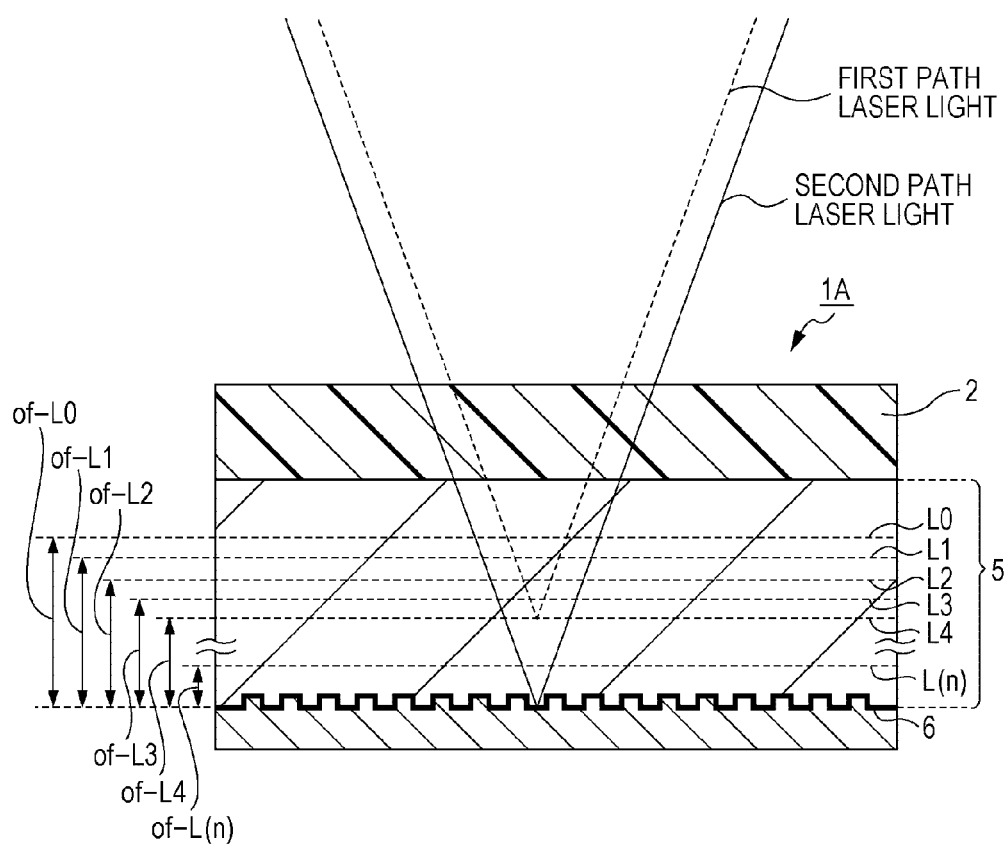
FIG. 8 is an illustration diagram of a servo control during recording of the second embodiment.

FIG. 8 shows an example of each offset of corresponding to a case where the information recording layers L0 to L(n) are set on the bulk layer 5. That is, there is shown a case where offset of-L0 corresponding to the layer position of the recording layer L0 is set, offset of-L1 corresponding to the layer position of the recording layer L1 is set, . . . offset of-L(n) corresponding to the layer position of the recording layer L(n) are set.

By driving the first path laser focus mechanism using the value of the offset of, the formation position (recording position) of the mark in the depth direction can be suitably selected among from the layer position as the recording layer L0 to the layer position as the recording layer L(n).

Furthermore, the tracking servo relative to the first path laser light during recording is realized by performing the tracking servo of the object lens that uses the reflective light of the second path laser light from the standard and tilt detection surface 6, using the fact that the first path laser light and the second path laser light are irradiated via the common object lens as described above.

In addition, the acquisition of the address information during recording is acquired from the reflective light information of the second path laser light from the standard and tilt detection surface 6, using the fact that the wobbling groove with the address information recorded thereon is formed on the standard and tilt detection surface 6.

On the other hand, during reproduction, as shown in FIG. 7, since the recording layer L is formed on the bulk layer 5, the reflective light of the first path laser light from the recording layer L can be obtained. As a result, during reproduction, the focus servo in regard to the first path laser light can be performed using the reflective light of the first laser light itself.

Specifically, the focus servo in regard to the first path laser light during reproduction is performed by controlling the above-mentioned first laser light focus mechanism based on the reflective light of the first laser path light.

In addition, even during reproduction, the tracking servo of the first path laser light is realized by performing the tracking servo of the object lens based on the reflective light of the second path laser light.

Herein, even during reproduction, in order to read the address information recorded on the standard and tilt detection surface 6, the focus servo and the tracking servo of the second path laser light targeting the standard and tilt detection surface 6 are performed.

That is, even during reproduction, in the same manner as during recording, the position control of the object lens is performed so that the focus servo and the tracking servo of the second path laser light targeting the standard and tilt detection surface 6 are realized based on the reflective light of the second path laser light.

Next, the servo during tilt correction will be described based on FIG. 9.

Even in the second present embodiment, before the recording and reproducing action, the slope state of the incident light axis of the first path and second path laser lights onto the recording medium 1A relative to the recording medium 1A is varied to perform the tilt correction. The tilt correction is performed by driving the object lens in the tilt direction as an example.

Figure 9:
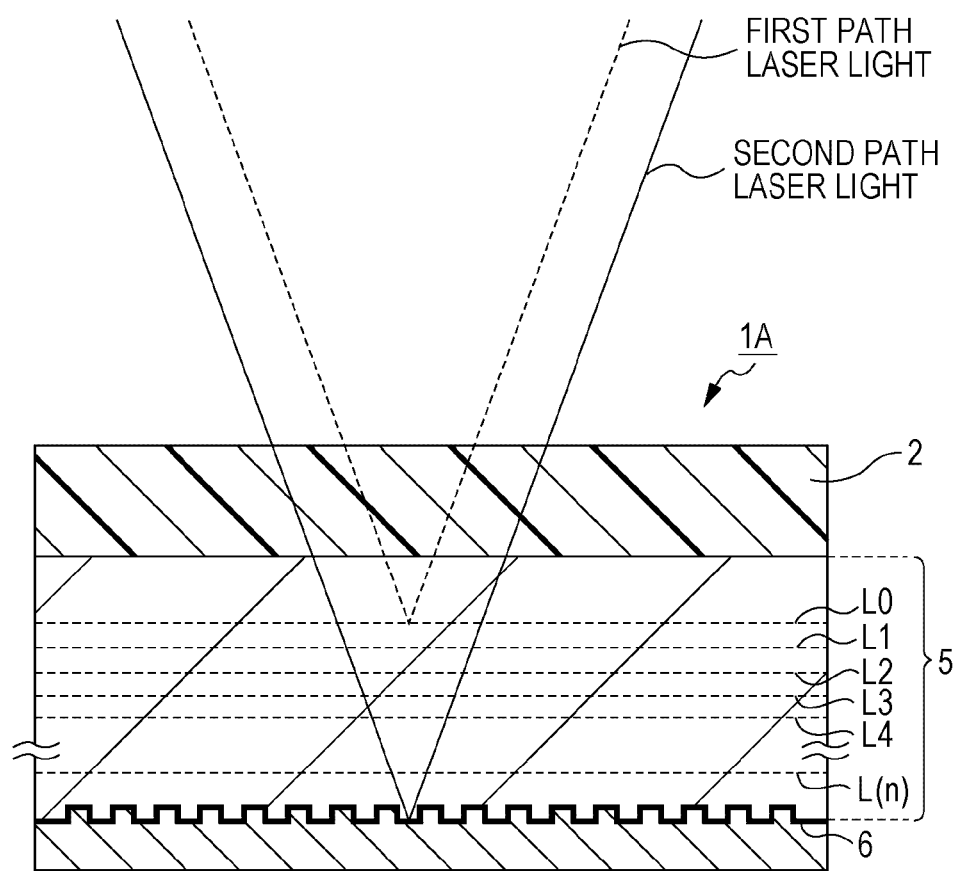
FIG. 9 is an illustration diagram of a servo control during tilt correction of the second embodiment.

As shown in FIG. 9, when performing the tilt correction, the second path laser light is subjected to the focus control with respect to the standard and tilt detection surface 6. That is, the focus servo of the second path laser light is performed by controlling the object lens using the reflective light (returning light) from the standard and tilt detection surface 6 of the second path laser light.

In addition, the first path laser light is not particularly defined.

Information for the tilt correction is obtained from the reflective light (returning light) from the standard and tilt detection surface 6 of the second path laser light.

In addition, in a case of wanting to perform the tilt correction at a specific position on the recording medium 1A, which is a case of wanting to acquire the address information, since the wobbling groove with the address information recorded thereon is formed on the standard and tilt detection surface 6, it may be acquired from the reflective light information of the second path laser light from the standard and tilt detection surface 6.

The recording medium 1A of the second embodiment also provides the standard and tilt detection surface 6 at the inside from the bulk layer 5, and performs the tilt correction based on the reflective light information of the second path laser light relative to the standard and tilt detection surface 6. Disposing the standard and tilt detection surface 6 for the tilt detection at the inside from the bulk layer 5 is carried out to make it possible to make the thickness t from the surface of the cover layer 2 to the standard and tilt detection surface 6 as large as possible.

That is, in the same manner as the case of the tilt detection surface 4 of the first embodiment, it is for the purpose of making the push pull signal or RF signal obtained from the reflective light information the preferable signal for the tilt control, thereby raising the tilt detection sensitivity. (see FIG. 4 and the description thereof).

[2-3 Recording and Reproducing Optical System]

Figure 10:
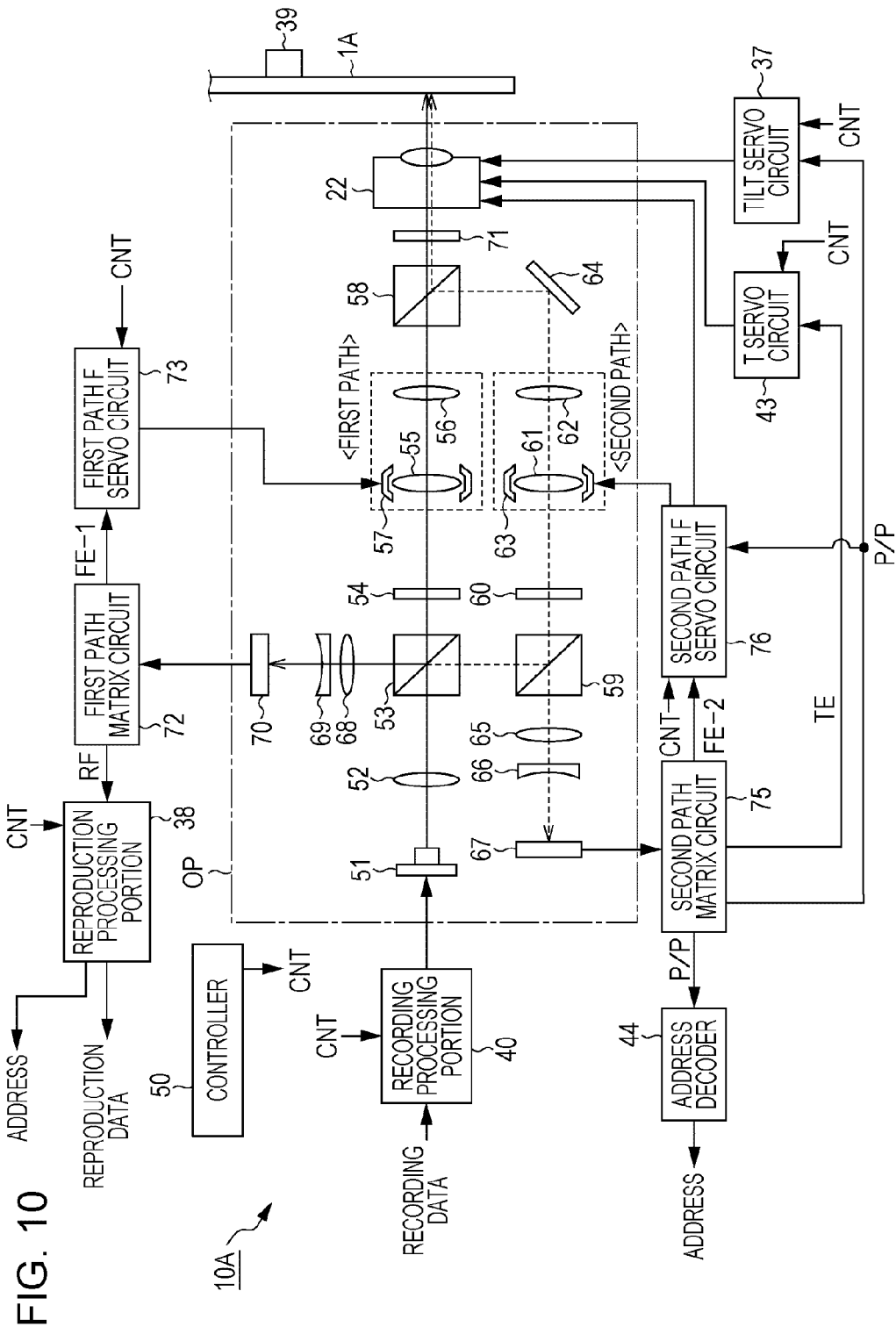
FIG. 10 is an illustration diagram of a recording and reproducing optical system of the second embodiment.

FIG. 10 shows a configuration of a recording and reproducing apparatus 10A (a recording medium driving apparatus) for performing the recording and reproducing in regard to the recording medium 1A of FIG. 7.

The recording medium 1A loaded with respect to the recording and reproducing apparatus 10A is rotated and driven by a spindle motor 39 in the drawing.

In addition, in the recording and reproducing apparatus 10A, an optical pickup OP is provided for irradiating the recording medium 1A, which is rotated and driven in this manner, with the first path and the second path laser lights.

In the optical pickup OP, a first laser diode 51 is provided which outputs blue violet laser light having the wavelength of about 405 nm.

The laser light from the laser diode 51 is divided into the first path and the second path in the optical system. The first path laser light is used in the information recording by the formation of the recording mark and the reproduction of information recorded by the recording mark, and a second path laser light is used in the focus servo, the tracking servo, and the tilt correction by the driving of the object lens 21.

Furthermore, NA of the object lens 21, which becomes an output end of the first path laser light and the second path laser light to the recording medium 1A, is 0.85.

Moreover, a first photo detector 70 for sensing the reflective light of the first path laser light from the recording medium 1A, and a second photo detector 67 for sensing the reflective light of the second path laser light from the recording medium 1A are provided.

The path of the first path laser light is indicated by the solid line, and the path of the second path laser light is indicated by the dashed line.

Firstly, the laser light emitted from the laser diode 51 becomes the parallel light in a collimator 52, and then, is incident onto a polarization beam splitter 53.

The polarization beam splitter 53 divides the incident laser light by the polarization. For example, the polarization beam splitter 53 causes a P polarization component to penetrate and reflects an S polarization component.

The penetration component (e.g., P polarization component) of the polarization beam splitter 14 becomes the first path laser light.

The first path laser light performs a so-called correction of off-axis aberration such as, for example, coma aberration or astigmatism by a liquid crystal element 54.

The first path laser light which has passed through liquid crystal element 54 is incident onto an expander including the lenses 55 and 56, and the lens drive portion 57. The lens 56 is a fixed lens and the lens 55 is a movable lens, so that the lens 55 is driven in a direction parallel to the optical axis of the first path laser light by the lens drive portion 57, whereby the expander performs the independent focus control in regard to the first path laser light.

The expander (the lens drive portion 57) offsets the focus position of the first path laser light based on the instruction of the controller 50 during recording and performs the focus control of the first path laser light based on the output signal from a first path laser focus servo circuit 73 during reproduction.

The first path laser light which has passed through the expander is incident onto a beam splitter 58 having a predetermined reflectivity and a part thereof penetrates. In addition, the first path laser light penetrates the ¼ wavelength plate 71 and is irradiated to the recording medium 1A via the object lens 21.

The object lens 21 is maintained by the actuator 22 so as to be displaceable in the focus direction, the tracking direction, and the tilt direction.

The actuator 22 displaces the object lens 21 in each direction by the drive current from the second path focus servo circuit 76, the tracking servo circuit 43, and the tilt servo circuit 37.

During reproduction, depending on the irradiation of the first path laser light with respect to the recording medium 1A as described above, the reflective light of the first path laser light from the recording medium 1A (particularly, the recording layer L to be reproduced in the bulk layer 5) can be obtained. The reflective light of the first path laser light obtained in this manner is guided via the object lens 21 and the ¼ wavelength plate 71 to the beam splitter 58 and a part thereof penetrates the beam splitter 57.

The reflective light of the first path laser light penetrated the beam splitter 57 is incident onto the polarization beam splitter 53 via the lenses 56 and 57 and the liquid crystal element 54 constituting the expander.

Herein, the reflective light (backward path light) of the first path laser light incident onto the polarization beam splitter 53 in this manner is configured so that the polarization direction thereof is different from that of the forward path light of the first path laser light by 90°, by the action by the ¼ wavelength plate 71 and the action of the reflection in the recording medium 1A. As a result, the reflective light of the first path laser light incident as described above is reflected by the polarization beam splitter 53.

The reflective light of the first path laser light reflected by the polarization beam splitter 53 is concentrated on the detection surface of the first photo detector 70 via the light concentration lens 68 and the cylindrical lens 69.

On the other hand, the second path laser light is as follows.

Among the laser light emitted from the laser diode 51, a component (e.g., S polarization component) reflected by the polarization beam splitter 53 becomes a second path laser light.

The second path laser light is guided to the polarization beam splitter 59. Even in the polarization beam splitter 59, in the same manner as the polarization beam splitter 53, for example, by reflecting the S polarization, the second path laser light is guided to the liquid crystal element 54 side. In addition, after being subjected to the aberration correction by the liquid crystal element 54, the second path laser light is incident onto the expander including the lenses 61 and 62 and the lens drive portion 63. The lens 62 is the fixed lens and the lens 61 is the movable lens, so that the lens 61 is driven in a direction parallel to the optical axis of the second path laser light by the lens drive portion 63, whereby the expander can perform the independent focus control in regard to the second path laser light.

The second path laser light which has passed through the expander is reflected by the mirror 64 and is incident onto the beam splitter 58, and a part thereof is reflected. In addition, the second path laser light penetrated the ¼ wavelength plate 71 and is irradiated to the recording medium 1A via the object lens 21.

Furthermore, the reflective light (reflective light from the standard and tilt detection surface 6) of the second path laser light obtained corresponding to the irradiation of the second path laser light to the recording medium 1A in this manner is partly reflected by the beam splitter 58 via the object lens 21 and the ¼ wavelength plate 61. In addition, the reflective light is incident onto the polarization beam splitter 59 via the mirror, the lenses 62 and 61 and the liquid crystal element 60.

At this time, in the same manner as the case of the first path laser light, the reflective light (backward path light) of the second path laser light is configured such that the polarization direction thereof is different from that of the forward path light by 90°, by the action of the ¼ wavelength plate 71 and the action of the reflection in the recording medium 1A. Thus, the reflective light of the second path laser light as the backward path light penetrates the polarization beam splitter 59.

In addition, the backward path light of the second path laser light penetrated the beam splitter 59 is concentrated on the detection surface of the second photo detector 67 via a light concentration lens 65 and a cylindrical lens 66.

In addition, in the case of the present case, since the backward path light is divided by the beam splitter 58 having a predetermined transmittance, there is a part of the backward path light of the second path also mixed in the backward path light of the first path. However, since the backward path light of the second path becomes, for example, the P polarization component, it is penetrated by the polarization beam splitter 53. Thus, only the backward path light component of the first path laser light is incident onto the first photo detector 70.

Similarly, there is a part of the backward path light of the first path also mixed in the backward path light of the second path. However, since the backward path light of the first path becomes, for example, the S polarization component, it is reflected by the polarization beam splitters 59 and 53. Thus, only the backward path optical component of the second path laser light is incident onto the second photo detector 67.

Furthermore, in the recording and reproducing apparatus 10A, there are provided a recording processing portion 40, a first path matrix circuit 72, a first path focus servo circuit 73, a tilt servo circuit 37, a reproduction processing portion 38, a second path matrix circuit 75, a second path focus servo circuit 76, a tracking servo circuit 43, an address decoder 44, and a controller 50.

Firstly, data (recording data) to be recorded with respect to the recording medium 1A is input to the recording processing portion 40. The recording processing portion 40 performs an addition of an error correction code or a predetermined recording modulation encoding with respect to the input recording data, thereby obtaining recording modulation data rows which are binary data rows of "0" and "1" to be actually recorded on the recording medium 1A.

Furthermore, the light strategy is performed based on the recording modulation data row, thereby creating the laser drive signal. In addition, the laser drive signal is given to the laser diode 51, thereby performing the light emission driving of the laser diode 51.

The first path matrix circuit 72 includes a current-voltage conversion circuit, a matrix calculation/amplification circuit or the like corresponding to the output current from a plurality of light sensing elements as the first photo detector 70, thereby creating the requisite signal by the matrix calculation processing.

Specifically, high frequency signal (reproduction signal RF) corresponding to the reproduction signal, and a focus error signal FE-1 for the focus servo control are created.

The reproduction signal RF created in the first path matrix circuit 72 is supplied to the reproduction processing portion 38. Furthermore, the focus error signal FE-1 is supplied to the first path focus servo circuit 73.

The reproduction processing portion 38 performs the reproduction processing for restoring the recording data described above such as the binarization processing, the decoding and error correction processing of the recording modulation code or the like in regard to the reproduction signal RF created in the first path matrix circuit 72, thereby obtaining the reproduction data that reproduced the recording data.

Furthermore, during reproduction, the extraction of the address information from the reproduction data is also performed. The address information is supplied to the controller 50.

Moreover, the first path focus servo circuit 73 creates the focus servo signal based on the focus error signal FE-1 and controls the driving of the lens drive portion 57 based on the focus servo signal, thereby performing the focus servo control in regard to the first path laser light.

During recording, the first path focus servo circuit 73 performs the driving control of the lens drive portion 57 based on the offset of (see FIG. 8) commanded from the controller 50. Furthermore, during reproduction, the first path focus servo circuit 73 performs the driving control of the lens drive portion 57 so that an interlayer jump action between the recording layers L formed on the recording medium 1A or a leading-in of the focus servo relative to the requisite recording surface L are performed corresponding to the instruction from the controller 50.

On the other hand, in regard to the second path laser light side, the second path matrix circuit 75 includes a current-voltage conversion circuit, a matrix calculation/amplification circuit or the like corresponding to the output current from a plurality of light sensing elements as the second photo detector 67 and creates the requisite signal by the matrix calculation processing.

Specifically, the second path matrix circuit 75 creates a focus error signal FE-2 for the servo control, a tracking error signal TE, and a push pull signal P/P for the address extraction or the tilt detection.

The focus error signal FE-2 is supplied to the second path focus servo circuit 76, and the tracking error signal TE is supplied to the tracking servo circuit 43. The push pull signal P/P is supplied to the address decoder 44, the tilt servo circuit 37, and the second path focus servo circuit 76.

The second path focus servo circuit 76 creates the focus servo signal based on the focus error signal FE-2 and drives the focus coil of the actuator 22 based on the focus servo signal, thereby performing the focus servo control relative to the object lens 21. The focus servo control of the object lens 21 is performed based on the reflective light of the second path laser light during recording and reproducing.

Furthermore, the second path focus servo circuit 76 can perform the focus servo of the second path laser light, which is independent from the first path laser light, even by driving the lens drive portion 63.

The second path focus servo circuit 76 suitably drives one or both of the actuator 22 and the lens drive portion 63 such that the leading-in of the focus servo to the standard and tilt detection surface 6 formed on the recording medium 1A is performed corresponding to the control signal CNT from the controller 50.

In addition, the second path focus servo circuit 76 also controls the expander (lens drive portion 63) corresponding to the push pull signal P/P during tilt detection.

The tracking servo circuit 43 creates the tracking servo signal based on the tracking error signal TE from the second path matrix circuit 75, and drives the tracking coil of the actuator 22 based on the tracking servo signal. The tracking servo control of the object lens 21 is performed based on the reflective light of the second path laser light during recording and reproducing.

The address decoder 44 performs the decoding of the address information from the input push pull signal P/P.

Since the second path laser light is focused on the standard and tilt detection surface 6, the reflective light thereof has information of the wobbling groove formed on the standard and tilt detection surface 6.

The second path matrix circuit 75 gives the address decoder 44 information of the wobbling groove as the push pull signal P/P. The address decoder 44 decodes the address information from the push pull signal P/P, thereby supplying the address information to the controller 50.

The tilt servo circuit 37 supplies the actuator 22 with the tilt drive signal and drives the object lens 21 as the action for the tilt correction to the actuator 22 in the tilt direction. In addition, by the push pull signal P/P to be input, it is decided whether or not there is an optimal tilt state. That is, the tilt servo circuit 37 performs the action of exploring a tilt correction position where the level of the push pull signal P/P is maximized, while driving the actuator 22 in the tilt direction.

The tilt servo circuit 37 performs the action based on the control signal CNT from the controller 50. The controller 50 controls the tilt servo circuit 37 so as to perform the tilt correction before the recording action or the reproduction action.

As described in FIG. 5, the controller 50 gives the requisite each portion the control signal CNT, thereby performing the overall control of the recording and reproducing apparatus 10A.

For example, during recording, the controller 50 performs the controlling (selection of the recording position in the depth direction) of the focus position of the first path laser light based on the values of the offset of which were set corresponding to each layer position as described in FIG. 8. That is, the controller 50 performs the selection of the recording position in the depth direction, by commanding the first path laser focus servo circuit 73 to drive the lens drive portion 57 based on the values of the offset of which were set corresponding to the layer position to be recorded.

The values of the offset of are stored in the ROM in the controller 38, a flash memory or the like. By the setting of the values of offset of-L0 to of-L(n), the positions of each recording layer L0 to L(n) in the recording medium 1A are set.

Moreover, since the tracking servo control during recording is performed based on the reflective light of the second path laser light, during recording, the controller 50 commands the tracking servo circuit 43 to perform the tracking servo control based on the tracking error signal TE.

Furthermore, during recording, the controller 50 commands the second path focus servo circuit 76 to implement the focus servo control (focus servo control in regard to the object lens 21) based on the focus error signal FE-2.

Furthermore, although it is not shown, in the recording and reproducing apparatus 10A, a slide drive portion is provided for driving the whole of the optical pickup OP in the tracking direction in a sliding manner.

[2-4 Tilt Correction Processing]

The tilt correction processing implemented by the recording production apparatus 10A will be described.

The controller 50 controls each portion so as to implement the tilt correction before, for example, recording action and the reproduction action to control each portion.

Figure 11:
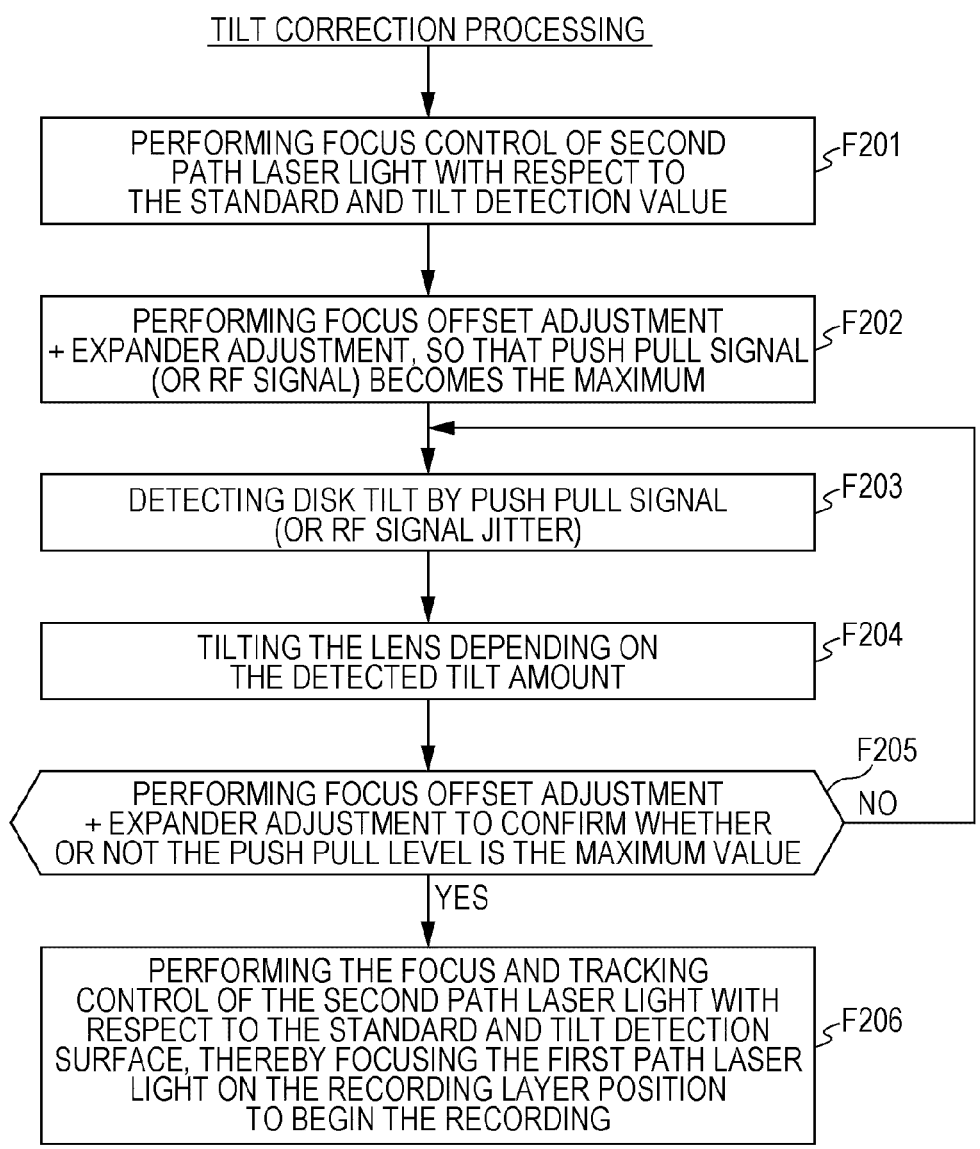
FIG. 11 is a flow chart of a tilt correction processing of the second embodiment.
Figure 12:
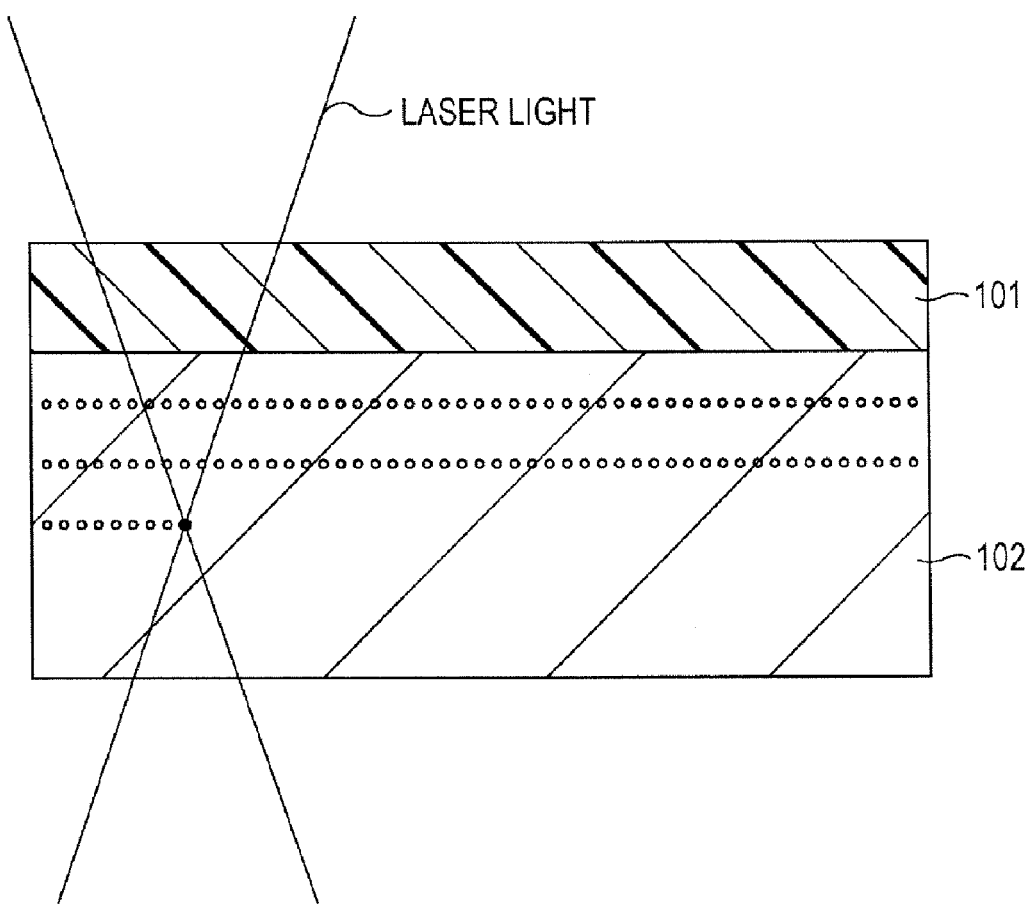
FIG. 12 is an illustration diagram of a micro hologram recording.
Figure 13A:
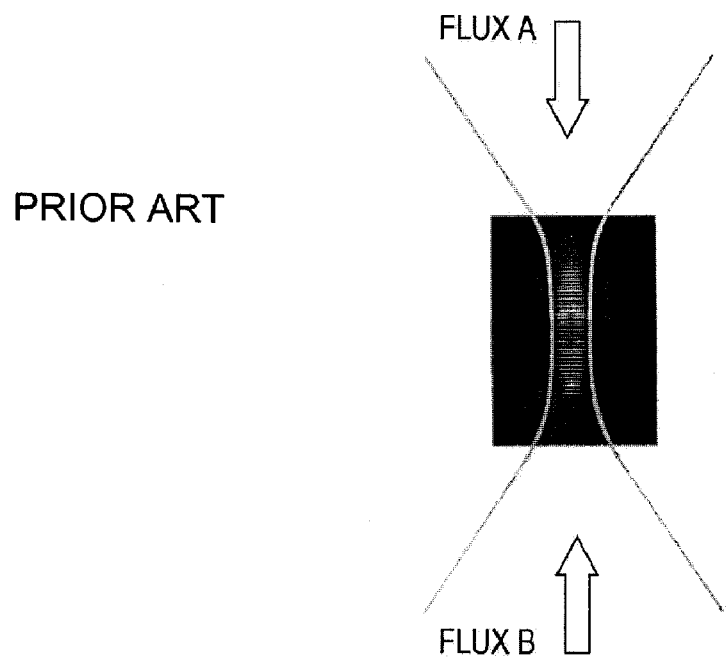
FIGS. 13A and 13B are illustration diagram of a positive type and a negative type micro hologram recording.
Figure 13B:
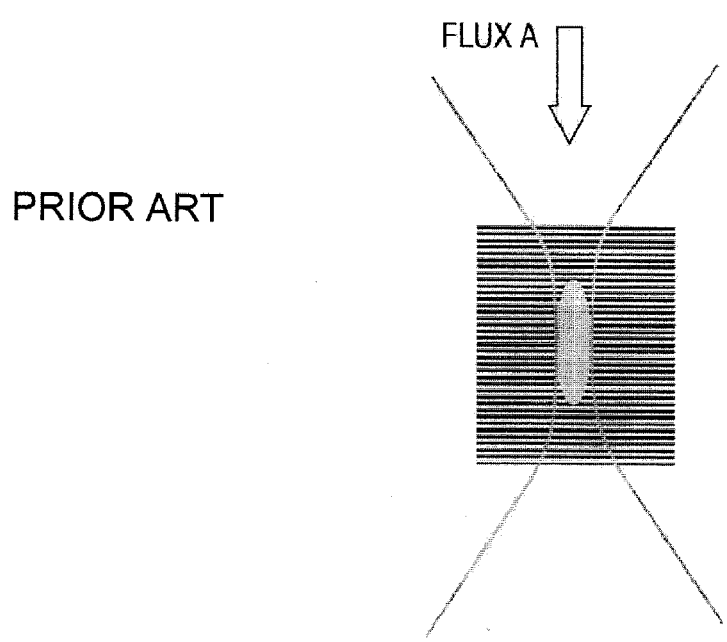

FIG. 11 is a flow chart of the tilt correction processing before the recording action performed by the recording and reproducing apparatus 10A. The actions of each step are configured so that each portion is performed based on the instruction of the controller 50.

Firstly, as step F201, the focus control of the second path laser light to the standard and tilt detection surface 6 is performed.

In this case, the second path focus servo circuit 76 controls the actuator 22, so that the second path laser light is focused on the standard and tilt detection surface 6 by the object lens 21.

Next, as step F202, the focus offset adjustment in the second path focus servo circuit 76 or a minute adjustment by the driving of the expander (the lens drive portion 63) of the second path is performed, so that the level of the push pull signal P/P input to the second path focus servo circuit 76 is maximized. In addition, the reproduction signal RF at this time may be detected, thereby performing the adjustment so that the reproduction signal RF is maximized.

Next, in steps F203 and F204, the correction action by the tilt servo circuit 37 is performed.

Firstly, in step F203, the tilt servo circuit 37 confirms the level of the push pull signal P/P to be input, thereby detecting the tilt amount. In addition, the tilt amount can also be detected from the jitter of the reproduction signal RF.

In addition, in step F204, the actuator 22 is driven depending on the tilt amount, thereby driving the object lens 21 in the tilt direction.

In that state, in step F205, the second path focus servo circuit 76 performs the focus offset adjustment and the minute adjustment of the expander again.

In addition, it is confirmed whether or not the level of the push pull signal P/P is maximized. That is, the level of the push pull signal P/P as the index indicating the tilt amount is confirmed, thereby confirming whether or not the tilt amount becomes optimal (≈zero).

At this time, if the tilt amount=zero (or within a predetermined allowable range), the tilt correction has been completed and the process progresses to step F206.

On the other hand, if the tilt amount is not zero or within a predetermined allowable range, the progress returns to step F203 to continue the tilt correction. That is, the tilt servo circuit 37 detects the tilt amount from the level of the push pull signal P/P at that time again, thereby driving the object lens 21 in the tilt direction depending on the tilt amount.

This processing is repeated until the tilt amount=zero (or within a predetermined allowable range) in step F205.

After the tilt correction has been completed in step F205, in step F206, the recording begins. In this case, the second path laser light is subjected to the focus control at the standard and tilt detection surface 6 by the second path focus servo circuit 76, and the tracking servo circuit 43 performs the tracking control.

Furthermore, in regard to the first path laser light, the first path focus servo circuit 73 controls the expander (lens drive portion 57) of the first path, thereby giving the offset of (see FIG. 8) corresponding to the depth position of the recording layer L to be recorded.

In this state, the address information obtained from the returning light of the second path laser light, the absolute position on the recording medium 1A is confirmed, thereby starting the mark recording by the first path laser light from a predetermined address.

As described above, by performing the tilt correction before the start of recording, the recording is performed in the state in which a difference in spots between the first path laser light and the second path laser light is eliminated.

Thus, the corresponding relationship between the address information, which is recorded on the standard and tilt detection surface 6 by the wobbling groove, and the recording information in the recording layer L becomes optimal. As a result, in the recording medium 1A in which the address information is recorded on the standard and tilt detection surface 6, accurate recording onto the bulk layer 5 is realized without the address information.

In addition, even during reproduction, it is desirable to perform the same tilt correction as steps F201 to F205 of FIG. 11. As a result, the access to the reproduction position based on the address information obtained from the standard and tilt detection surface 6 is accurately implemented.

Although the embodiments have been described above, the present invention is not limited to the embodiments.

For example, as the configuration of the recording medium 1 of the first embodiment, the tilt detection surface 6 may not necessarily be formed all over the region of the disc-shaped recording medium 1. That is, if a radius position for performing the tilt detection is specified, the tilt detection surface 6 may be provided at the radius position.

Furthermore, in the first embodiment, it is also possible that the groove of the tilt detection surface 6 is configured as the wobbling grove or pit row with the address information recorded thereon and only the first laser light is used during tilt detection.

The present application contains subject matter related to that disclosed in Japanese Priority Patent Application JP 2009-276318 filed in the Japan Patent Office on Dec. 4, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical recording medium driving apparatus comprising:
   an optical pickup to irradiate first and second laser lights from one object lens with respect to an optical recording medium which has a bulk layer on which optical recording information is recorded by laser light irradiation and a plurality of recording layers with optical recording information recorded thereon is formed and which has a tilt detection surface which is formed at an inner side from the bulk layer when seen from a laser light incident surface side;

a focus control portion to perform the focus control relative to each predetermined position of the optical recording medium in regard to each of the first and second laser lights;

a tracking control portion to control the position of the object lens to perform tracking control of the first and second laser lights relative to the optical recording medium; and a tilt control portion to vary a slope state of an incident light axis of the first and second laser lights to the optical recording medium, relative to the optical recording medium, based at least in part on information of a returning light of the laser light of either the first or second laser lights from the tilt detection surface, thereby performing a tilt correction;

in the optical recording medium, at a front side from the bulk layer when seen from the laser light incident surface side, a standard surface is provided which is formed with a groove having address information, the first and second laser lights are laser lights having wavelengths different from each other in which the first laser has a short wavelength, when performing the tilt correction, the focus control portion performs the focus control of the first laser light with respect to the tilt detection surface, in the state the focus control of the second laser light with respect to the standard surface having been performed, and the tilt control portion performs the tilt correction based on information of the returning light of the first laser light from the tilt detection surface.

2. The optical recording medium driving apparatus according to claim 1, wherein, when performing the recording onto the optical recording medium, in the state the tilt correction having been performed, the focus control portion performs the focus control of the second laser light with respect to a standard surface, and the tracking control portion performs the tracking control based on information of the returning light of the second laser light from the standard surface, and the focus control portion performs the recording of the optical recording information by the first laser light, in the state the focus control of the first laser light to a recording layer forming position having been performed.

3. The optical recording medium driving apparatus according to claim 2, wherein, when performing the recording onto the optical recording medium, the address information is obtained from information of the returning light of the second laser light from the standard surface.

4. The optical recording medium driving apparatus according to claim 1, wherein the tilt control portion performs the tilt correction based on a push pull signal as information of a returning light from the tilt detection surface, or a RF signal of a jitter.

5. An optical recording medium driving apparatus comprising:

an optical pickup to irradiate first and second laser lights from one object lens with respect to an optical recording medium which has a bulk layer on which optical recording information is recorded by laser light irradiation and a plurality of recording layers with optical recording information recorded thereon is formed and which has a tilt detection surface which is formed at an inner side from the bulk layer when seen from a laser light incident surface side;

a focus control portion to perform the focus control relative to each predetermined position of the optical recording medium in regard to each of the first and second laser lights;

a tracking control portion to control the position of the object lens to perform tracking control of the first and second laser lights relative to the optical recording medium; and a tilt control portion to vary a slope state of an incident light axis of the first and second laser lights to the optical recording medium, relative to the optical recording medium, based at least a tilt control portion to vary a slope state of an incident light axis of the first and second laser lights to the optical recording medium, relative to the optical recording medium, based at least in part on information of a returning light of the laser light of either the first or second laser lights from the tilt detection surface, thereby performing a tilt correction;

wherein the tilt detection surface in the optical recording medium is formed as a groove or a pit row having address information, wherein the first and second laser lights are laser lights having the same wavelength, wherein, when performing the tilt correction, the focus control portion performs the focus control of the second laser light with respect to the tilt detection surface, and wherein the tilt control portion performs the tilt correction based on information of the returning light of the second laser light from the tilt detection surface.

6. The optical recording medium driving apparatus according to claim 5, wherein, when performing the recording onto the optical recording medium, in the state the tilt correction having been performed, the focus control portion performs the focus control of the second laser light with respect to the tilt detection surface, the tracking control portion performs the tracking control based at least in part on information of the returning light of the second laser light from the tilt detection surface, and the focus control portion performs the recording of the optical recording information by the first laser light, in the state the focus control of the first laser light to a recording layer forming position having been performed.

7. The optical recording medium driving apparatus according to claim 6, wherein, when performing the recording onto the optical recording medium, the address information is obtained from information of the returning light of the second laser light from the tilt detection surface.

* * * * *